United States Patent [19]
Arita et al.

[11] Patent Number: 5,777,896
[45] Date of Patent: Jul. 7, 1998

[54] PLANT OPERATING AND MONITORING APPARATUS

[75] Inventors: Setsuo Arita, Hitachiota; Tetsuo Ito, Hitachi; Yukiharu Ohga; Fumio Murata, both of Katsuta; Yuichi Higashikawa, Hitachi; Hideyuki Sato, Hitachi; Mitsuru Kudo, Hitachi; Yuuzi Yamasawa, Hitachiota, all of Japan

[73] Assignee: Hitachi, Ltd., Tokyo, Japan

[21] Appl. No.: 871,548

[22] Filed: Jun. 9, 1997

Related U.S. Application Data

[63] Continuation of Ser. No. 453,337, May 30, 1995, which is a continuation of Ser. No. 631,443, Dec. 21, 1990, abandoned.

[30] Foreign Application Priority Data

Dec. 22, 1989 [JP] Japan .................................... 1-331327

[51] Int. Cl.⁶ ...................................................... G05B 19/00
[52] U.S. Cl. .......................... 364/550; 364/492; 340/679; 340/825.16; 376/245; 345/1
[58] Field of Search ........................ 364/550, 492, 364/494, 188, 191; 340/726, 716, 717, 718, 825.16, 825.17; 395/153, 155, 161; 376/716, 245; 345/1, 2, 3

[56] References Cited

U.S. PATENT DOCUMENTS

| | | | |
|---|---|---|---|
| 4,195,231 | 3/1980 | Reed et al. | 364/494 |
| 4,352,718 | 10/1982 | Impink, Jr. et al. | 376/216 |
| 4,432,064 | 2/1984 | Barker et al. | 364/550 |
| 4,500,953 | 2/1985 | Sugimoto et al. | 364/186 |
| 4,563,746 | 1/1986 | Yoshida et al. | 364/551.01 |
| 4,570,217 | 2/1986 | Allen et al. | 364/191 |
| 4,639,881 | 1/1987 | Zingber | 364/188 |
| 4,644,478 | 2/1987 | Stephens et al. | 364/188 |
| 4,644,479 | 2/1987 | Kemper et al. | 364/550 |

(List continued on next page.)

FOREIGN PATENT DOCUMENTS

| | | |
|---|---|---|
| 372924 | 1/1989 | European Pat. Off. |
| 60-89209 | 5/1985 | Japan |
| 62174809 | 1/1988 | Japan |
| 63-159909 | 7/1988 | Japan |
| 64-53209 | 3/1989 | Japan |
| 01053209 | 6/1989 | Japan |

OTHER PUBLICATIONS

Akira Kaji and Kazuo Aoki, "Advanced Features of a Computer System for Thermal Power Plants", *Hitachi Review*, Aug. 1988, vol. 37, No. 4, pp. 237–244, Tokyo Japan.

(List continued on next page.)

*Primary Examiner*—James P. Trammell
*Assistant Examiner*—Eric W. Stamber
*Attorney, Agent, or Firm*—Antonelli, Terry, Stout, & Kraus, LLP

[57] ABSTRACT

In an apparatus for operating and monitoring a plant, a manipulating device provides the plant with manipulation signals for operating the plant. In response to information supplied from the plant and a manipulating signal of the manipulating device, a first display data producing device produces first display data needed for the operation of the plant changing every moment. On the basis of data supplied from the first display data producing device, a first display device displays information relating to the operation of the plant. In response to information supplied from the plant and a manipulating signal of the manipulating device, a second display data producing device produces data needed for monitoring the plant. On the basis of data supplied from the second display data producing device, a second display device displays information relating to the monitoring of the plant on a larger display screen than that of the first display device. Information displayed by the first display device and information displayed by the second display device complement each other and make it possible to accurately operate and monitor the plant.

15 Claims, 20 Drawing Sheets

U.S. PATENT DOCUMENTS

| | | | |
|---|---|---|---|
| 4,694,406 | 9/1987 | Shibui et al. | 379/96 |
| 4,718,025 | 1/1988 | Minor et al. | 364/550 |
| 4,742,445 | 5/1988 | Watanabe | 364/492 |
| 4,800,376 | 1/1989 | Suga et al. | 340/716 |
| 4,803,039 | 2/1989 | Impink, Jr. et al. | 364/188 |
| 4,805,089 | 2/1989 | Lane et al. | 364/188 |
| 4,816,208 | 3/1989 | Woods et al. | 376/216 |
| 4,833,622 | 5/1989 | Barto et al. | 364/550 |
| 4,834,473 | 5/1989 | Keyes IV et al. | 395/275 |
| 4,853,175 | 8/1989 | Book, Sr. | 364/492 |
| 4,864,512 | 9/1989 | Coulson et al. | 340/716 |
| 4,957,690 | 9/1990 | Fennern | 364/492 |
| 5,247,433 | 9/1993 | Kitaura et al. | 364/188 |
| 5,267,277 | 11/1993 | Scorola et al. | 376/216 |

OTHER PUBLICATIONS

P. Hanbaba, "Man–Machine Communication in Thermal Power Plants", *ABB Review*, May 1989, No. 5, Zurich, Switzerland.

Ichiyen et al, "Computers' Key Role in Candu Control", *Nuclear Engineering International*, Aug. 1980, vol. 25, No. 303, pp. 28–32.

George et al, "Advanced Control Room Caters for the Operator", *Nuclear Engineering International*, Aug. 1980, vol. 25, No. 303, pp. 33–35.

Pope, "Ergonomic Design for Operator Flexibility", *Nuclear Engineering International*, Aug. 1980, vol. 25, No. 303, pp. 37–39.

Cain et al, "The Conceptual Design of a Power Plant Safety Panel", *Nuclear Engineering International*, Aug. 1980, vol. 25, No. 303, pp. 40–44.

FIG. 5

EXAMPLES OF DISPLAY SCREEN MENUS

1. DISPLAY SCREEN MENUS
2. CONTROL ROD CONTROL SYSTEM
3. WATER FEED SYSTEM
4. WATER FEED CONTROL SYSTEM
   ⋮

FIG. 7

EXAMPLES OF DISPLAY SCREEN MENUS

1. DISPLAY SCREEN MENUS
2. PLANT SUMMARY
3. IMPORTANT PARAMETER TREND
   ⋮

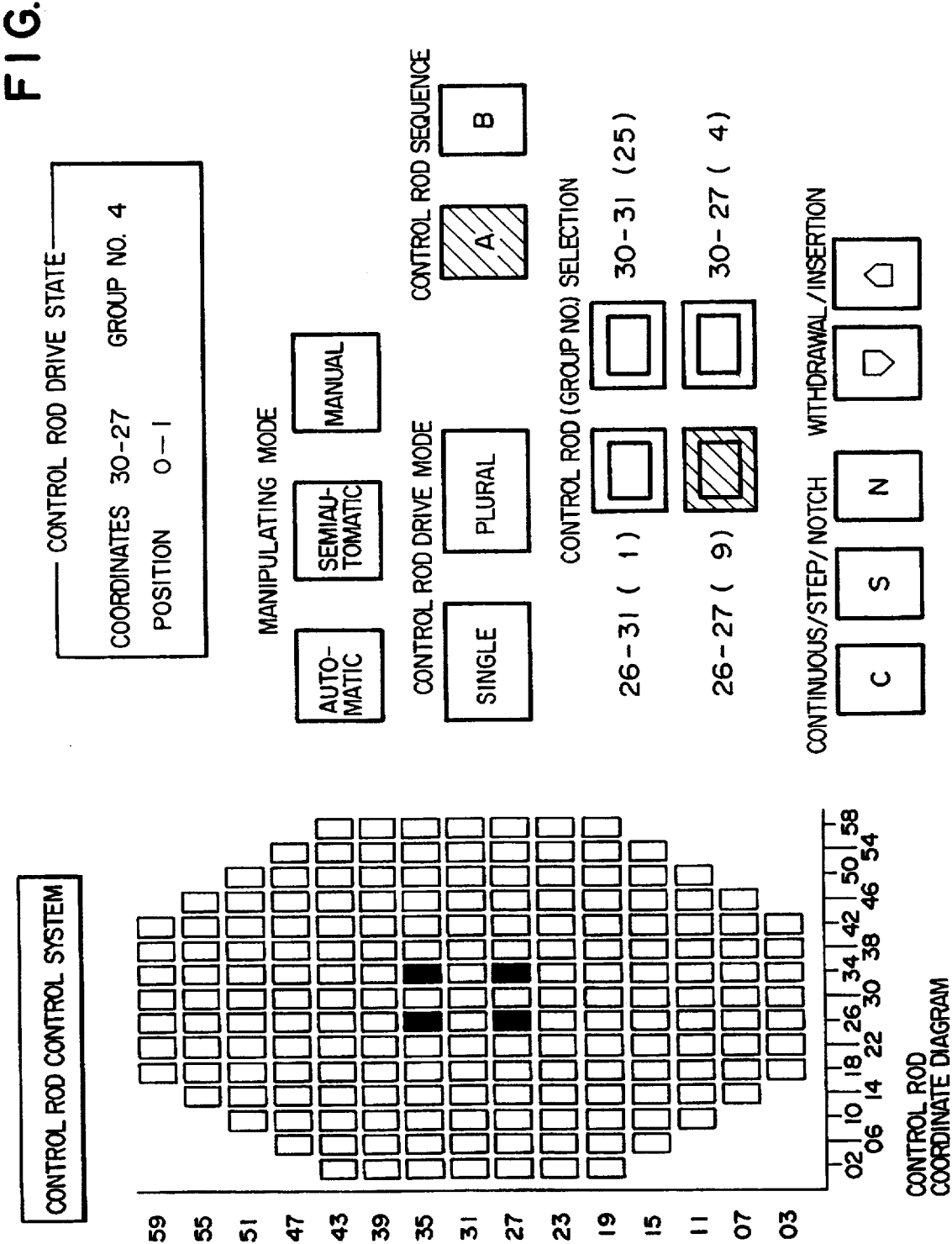

FIG. 11
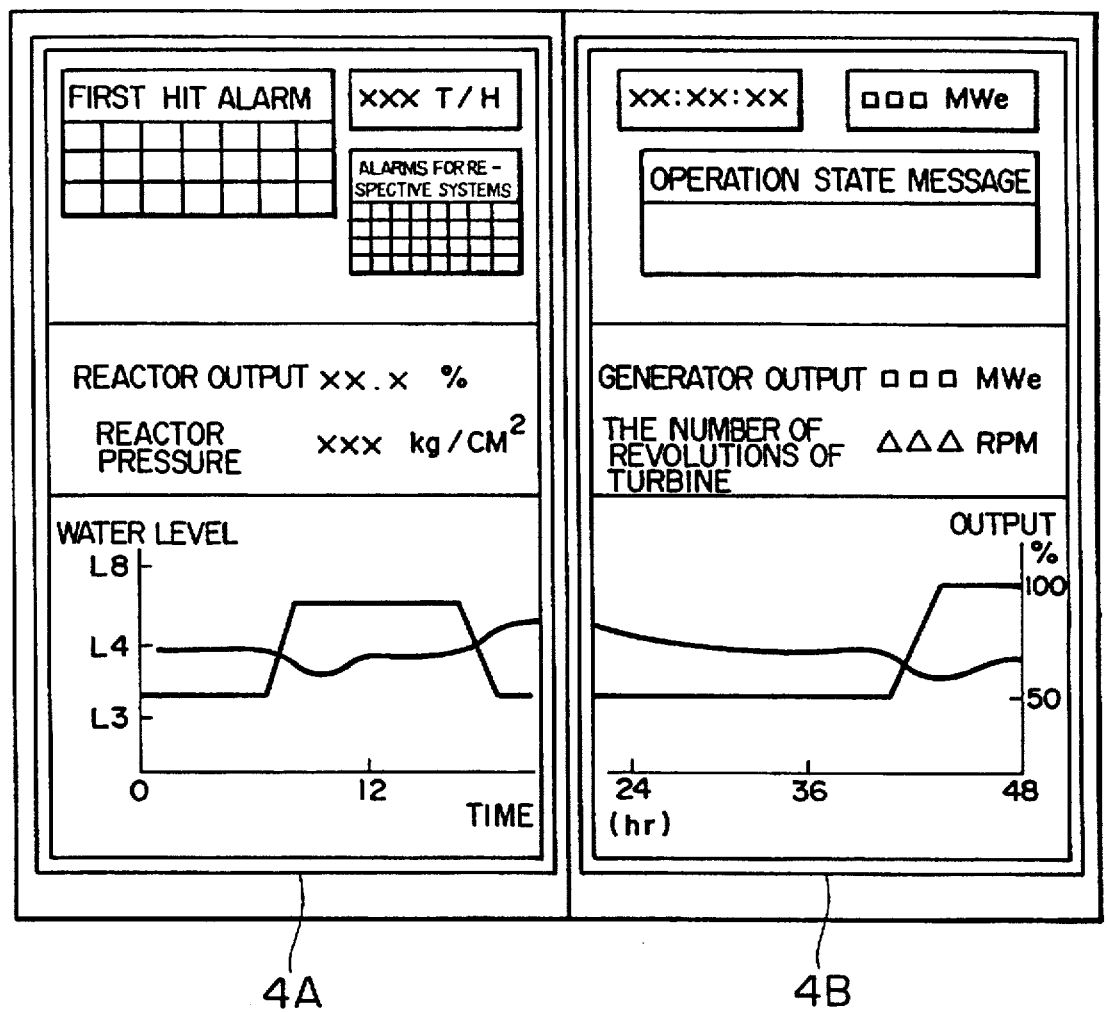
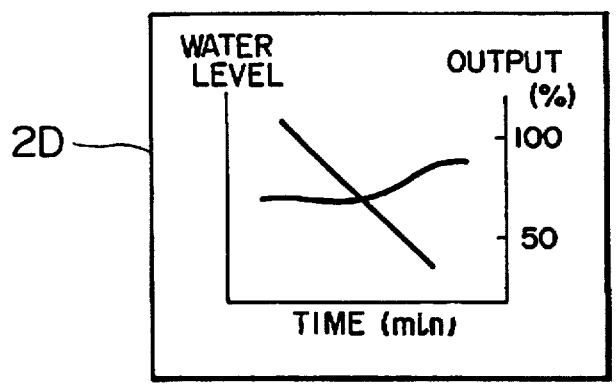

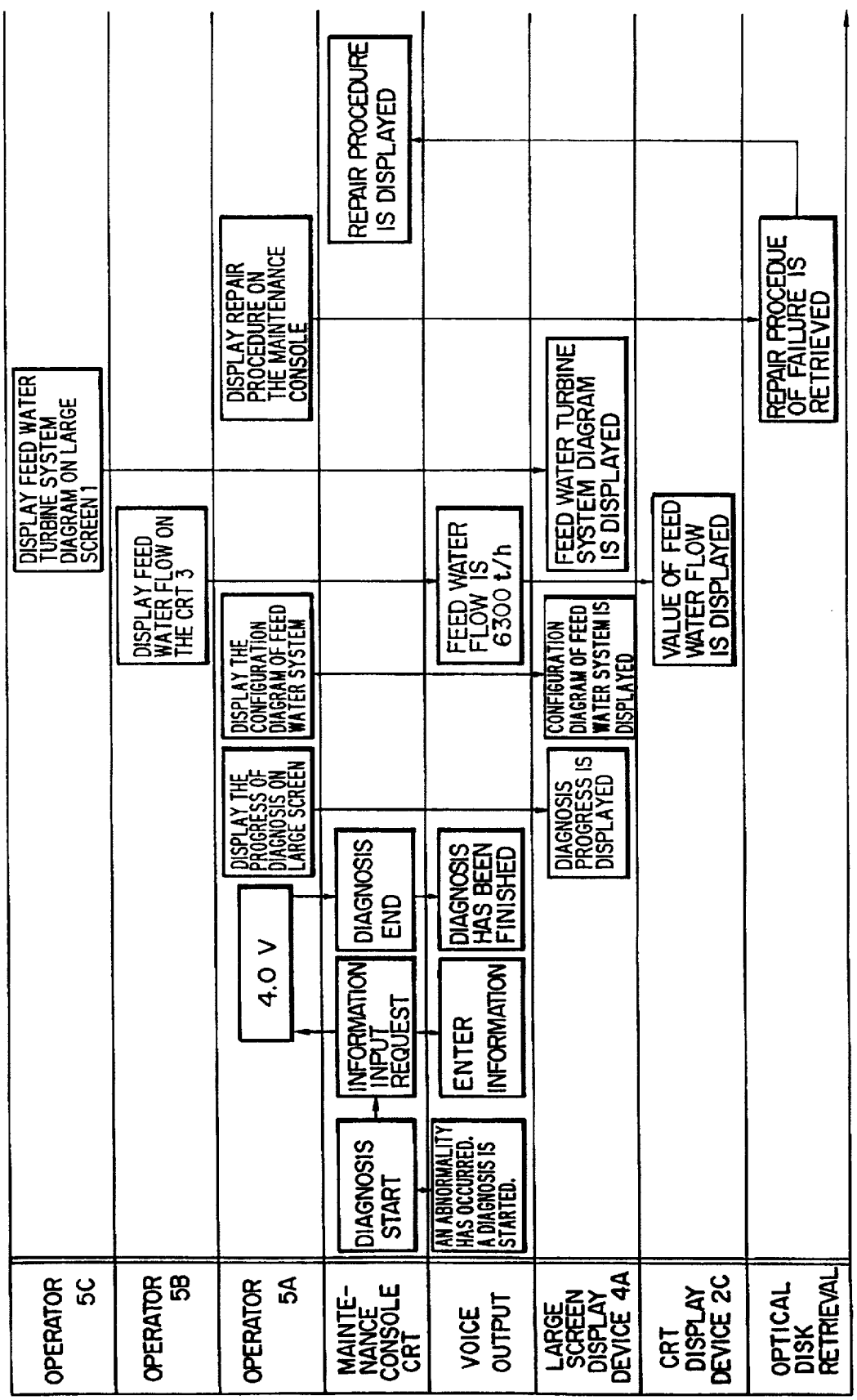

PLANT OPERATING AND MONITORING APPARATUS

This is a continuation of application Ser. No. 08/435,337, filed May 30, 1995 now allowed, which is a continuation of application Ser. No. 07/631,433 filed Dec. 21, 1990, now abandoned.

BACKGROUND OF THE INVENTION

The present invention relates to a plant operating and monitoring apparatus for operating and monitoring a plant such as a power plant, steel plant or chemical plant.

Operating and monitoring a large-sized plant such as a power plant, steel plant or chemical plant is desired to be easy for an operator to manipulate and understand. In order to satisfy such demands, it has been proposed to operate and monitor the plant by combining Cathode Ray Tubes (CRT's) mounted on a manipulating and monitoring panel whereby the operator performs manipulation and monitoring with large-sized display devices as described in JP-A-63-159909, for example. The plant operating and monitoring apparatus conventionally proposed is so configured that a large number of operators may watch simultaneously plant information on screens of large-sized display devices for expanding and displaying the same contents as those of the screen of the CRT's. As a result, grasp of an abnormal process state and decision of recovery processing can be executed by mutual consent. A manager can give instructions to an operator while watching the same screen.

In a huge system such as a power plant, steel plant, or chemical plant, a large number of subjects in the system state must be monitored and a large number of complicated subjects must be controlled. In such a system, not only operators but also the manager of the huge system must shoulder an extremely heavy burden. The larger and the more complicated the system is, the heavier the burden on the operators and manager becomes. In operating and monitoring a huge system, therefore, an operating and monitoring system capable of positively lightening the burden on the operators and manager is necessary. That is to say, it becomes necessary to provide the operators and manager with accurate necessary information and common recognition. From such a viewpoint, it is hereafter demanded to accurately provide information needed by the operators and manager according to the state (such as start, normal operation, shutdown or abnormal state) of a huge system as described above by combining large-screen display devices allowing a plurality of persons to watch the screen with CRT display devices now in wide use.

The above described prior art uses large-size display devices. Basically, however, the prior art only outputs, in accordance with selection and manipulation of an operator, information outputted to CRT display devices or other information stored in a computer for outputting information to the CRT display devices, to the large-screen display devices. Information needed by the operators or the manager is not outputted accurately according to the plant situation.

SUMMARY OF THE INVENTION

An object of the present invention is to provide a plant operating and monitoring apparatus capable of presenting accurately information needed by the operators and manager and providing the operators and manager with common recognition according to the plant state.

In accordance with the present invention, a plant operation apparatus comprises a manipulating and monitoring panel having manipulating means and first display means for operating the plant, and second display means having larger display screens than those of the first display means and located behind the manipulating and monitoring panel. First plant information required for an operator to manipulate or monitor the plant is displayed on the first display means, whereas second plant information whereby the peripheral plant situation including the subject of manipulation or the subject to be monitored can be understood is displayed on the second display means.

Herein, plant data required for an operator to manipulate or monitor the plant such as the state and the current value of the manipulated device are referred to as first plant information, whereas plant data including plant data representing the influence exerted by manipulating a plant device is referred to as second plant information.

Together with plant information required for an operator to manipulate the plant and displayed on the first display means (CRT's), plant information including plant data influenced by the manipulation is displayed on the second display means (the large-sized display devices). As a result, information required for monitoring the operation can be so provided that the operators and manager may understand the contents more easily while display contents of both display means are complementing each other.

In accordance with the present invention as heretofore described, information directly needed for manipulation of an operator is displayed on the CRT display devices installed on the manipulating and monitoring panel, and information representing relationship so that situation of peripheral apparatuses including a manipulated apparatus or a subject to be monitored may be grasped is displayed on the large-screen display devices installed behind the manipulating and monitoring panel. By making the most of the large-screen information, the operator applies feedback to manipulation information, manipulation being facilitated. In addition, a great number of people can understand the situation of the whole plant while understanding the situation of manipulation. While the CRT display devices and the large-screen display devices are complementing each other from the viewpoint of manipulation and monitoring, a large number of people can grasp information relating to the plant as significant information. As a result, the reliability of the plant operation is further improved.

Further, since a backup panel of normal system and a backup panel of safety system each comprising manipulation means and display means are juxtaposed with a backup monitoring panel, the safety of the plant is further raised. Further, by making a surveillance test for confirming the soundness of devices and the system executable from these backup panels, the reliability and safety of the plant as a whole including operators are further raised.

BRIEF DESCRIPTION OF THE DRAWINGS

FIGS. 5 and 7 are diagrams showing examples of display screen means in display data producing means of the CRT display device and the large-screen display device, respectively;

FIGS. 6, 8, 9(a), 9(b), 10(a), 10(b), 11, 12 and 13 are diagrams showing examples of screen display on the CRT display devices and the large-screen display devices;

FIG. 20 is a diagram for illustrating the operation in the configuration of FIG. 19.

DESCRIPTION OF THE PREFERRED EMBODIMENTS

FIGS. 1 to 4 show an embodiment of the present invention.

Figure 1:
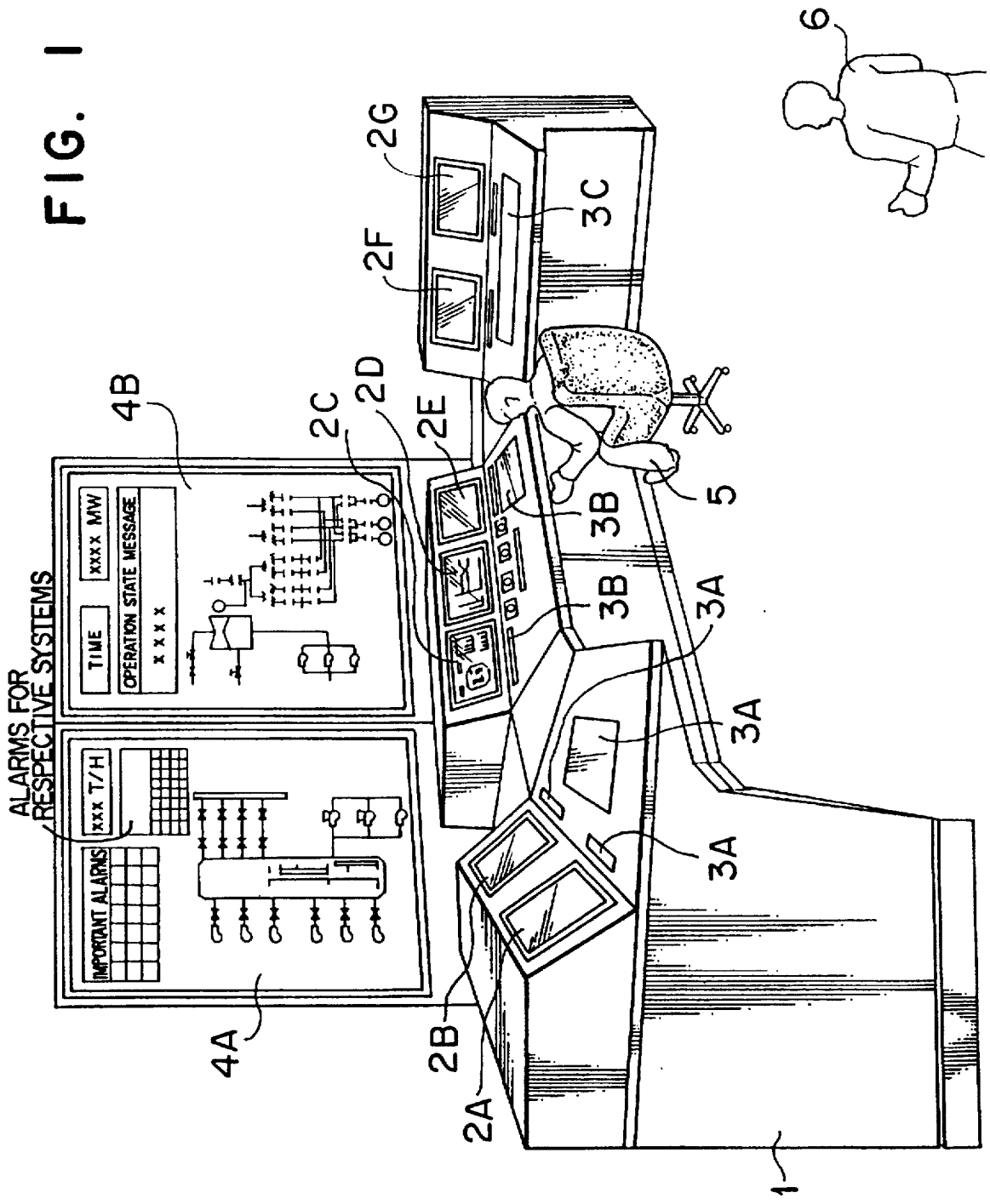
FIG. 1 is a general configuration diagram showing an embodiment of the present invention.

FIG. 1 shows the general configuration of the present invention. A manipulating and monitoring panel 1 comprises manipulating means 3A, 3B and 3C and seven first display means 2A–2G required for an operator 5 to operate and monitor a plant (not illustrated). The first display means 2A to 2G are CRT display devices. The manipulating means 3A–3C comprise switches or touch operation devices incorporated into the CRT display devices. Behind the manipulating and monitoring panel 1, second display means 4A and 4B having larger display screens than those of the first display means 2A–2G are installed. Hereafter, the second display means 4A and 4B are referred to as large-screen display devices. Owing to such configuration, the operator 5 can grasp not only information displayed on the CRT display devices 2A–2G installed on the manipulating and monitoring panel 1 but also information displayed on the large-screen display devices 4A and 4B. Further, a person 6 who is on duty to manage the whole plant (hereafter referred to as manager) is also capable of grasping information displayed on the large-screen display devices 4A and 4B. Therefore, information grasp, i.e., plant monitoring is further enhanced.

Figure 2:
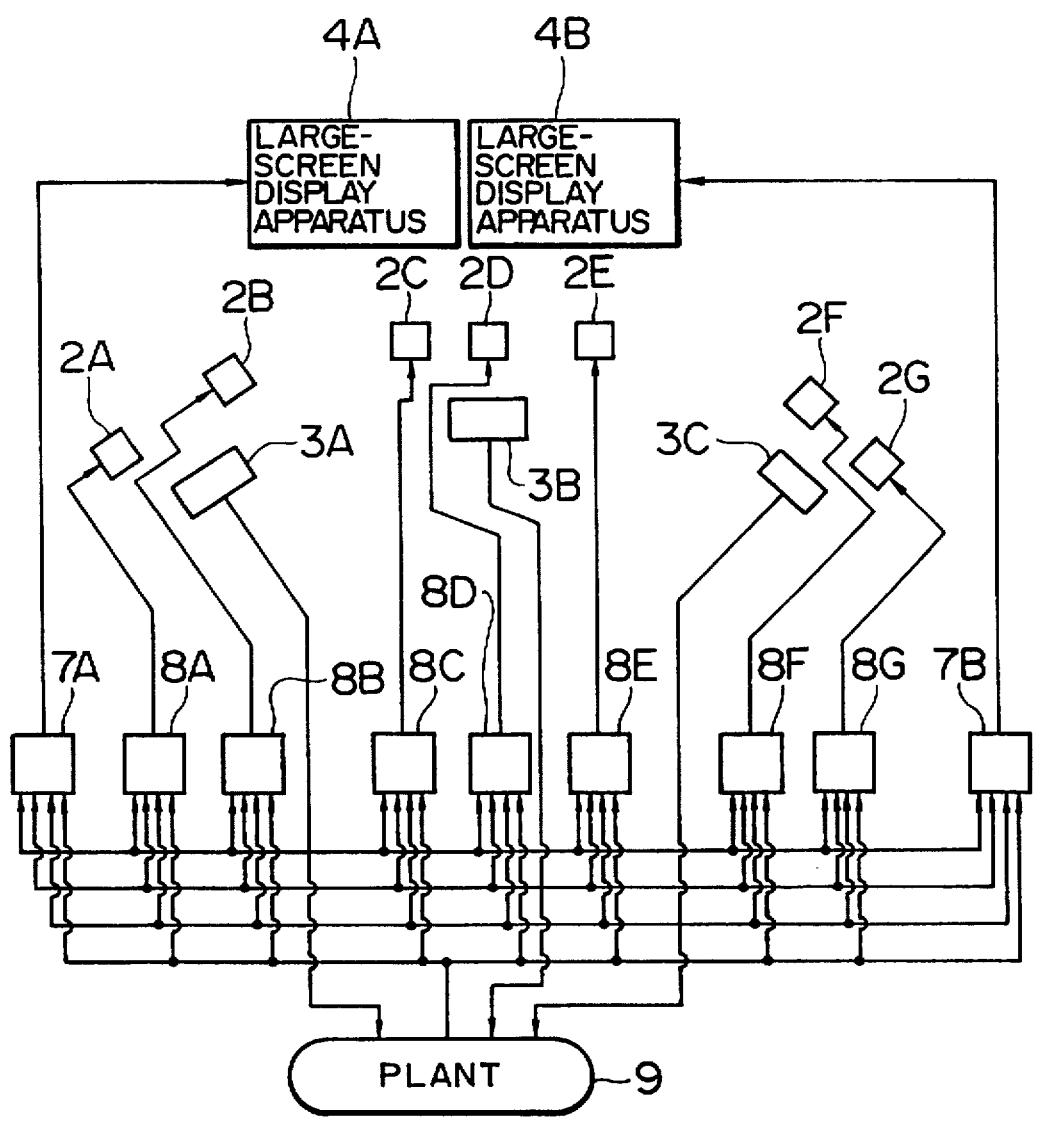
FIG. 2 is a configuration diagram showing an example of a display control device.

On the CRT display devices 2A–2G disposed on the manipulating and monitoring panel 1, information required for the operator 5 to operate and monitor the plant is displayed as shown in FIG. 2. Display data supplied to the CRT display devices 2A–2G are respectively produced by first display data producing means 8A, 8B, 8C, 8D, 8E, 8F and 8G on the basis of information supplied from a plant 9 or the result of manipulation of the operator 5 conducted by using the manipulating means 3A–3C. The operator 5 needs information required to operate the plant 9 changing every moment. Information relating to this is produced by the first display data producing means 8A–8G.

On the other hand, information displayed on the large-screen display devices 4A and 4B is monitored by not only operators but also a manager monitoring the plant. Information displayed on the large-screen display devices 4A and 4B is monitored by a great number of people in all operating modes such as plant start, normal operation, shutdown and abnormality. On all such occasions, suitable information must be presented. Information displayed on the large-screen display devices 4A and 4B of FIG. 1 is mainly information at the time of normal operation. In this example, detailed first plant information as displayed on the CRT display devices 2A–2G is not out-putted, but second plant information which is systematic and functional is outputted. The large-screen display devices 4A and 4B are so configured that the general configuration of the plant 9 and parameters important to plant administration may be displayed. As the message and states of important devices change in the general configuration of the plant according to the operation state, numerical values of important parameters are displayed every moment. Such information is produced by second display data producing means 7A and 7B on the basis of data supplied from the plant 9 and information supplied from the manipulating means 3A–3C.

Information comprising the general system diagram of the plant and important parameters as in the above described example is referred to as plant summary information.

From the viewpoint of easiness of information processing, it is desirable that the second and first display data producing means 7A, 7B and 8A–8G are implemented by using a computer.

Figure 3:
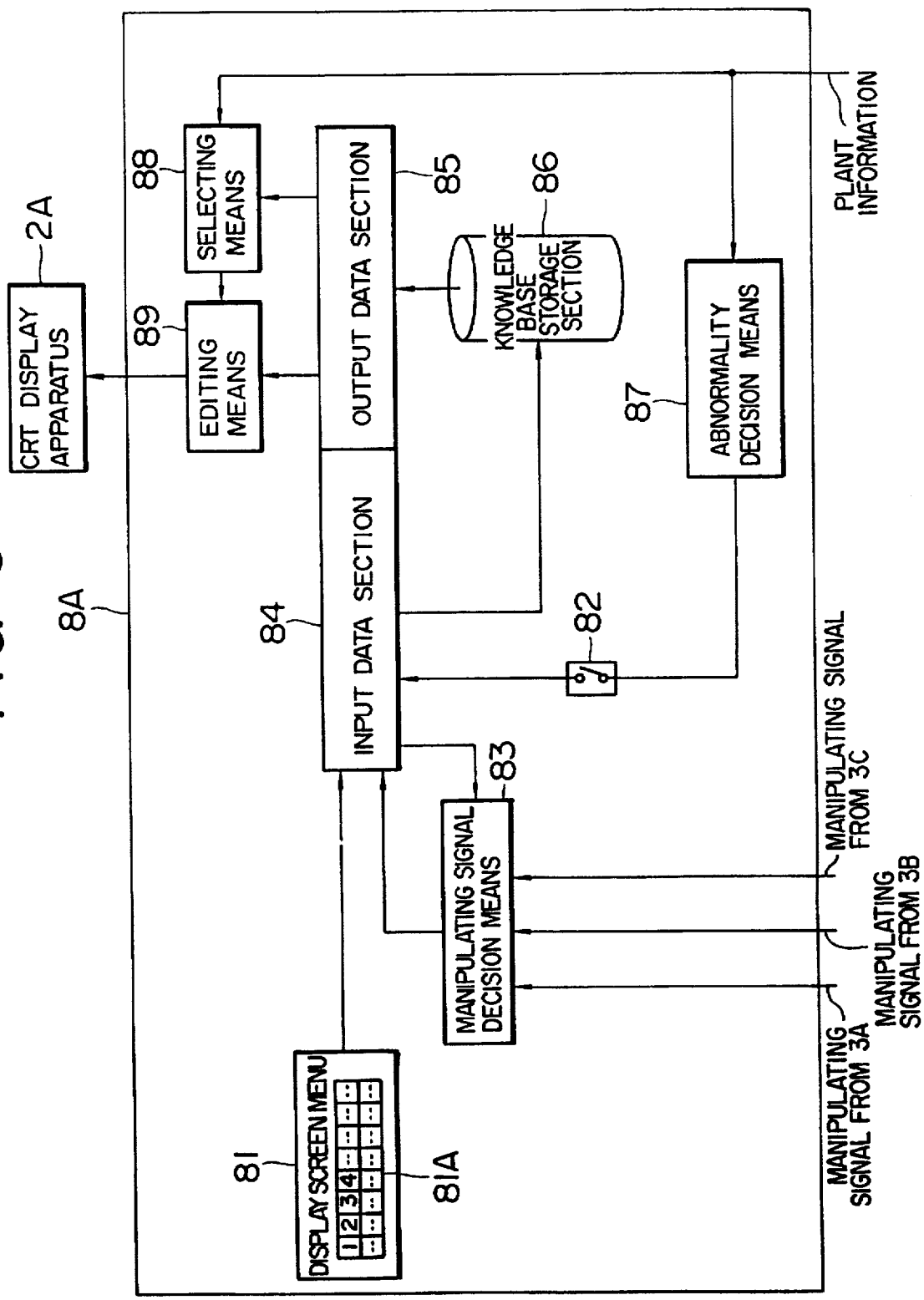
FIG. 3 is a configuration diagram showing an example of display data producing means of a CRT display apparatus.

FIG. 3 shows an example of the display data producing means 8A–8G.

Display screen menu means 81 has a plurality of menus associated with function keys 81A as shown in FIG. 5. If a key 1 in the function keys 81A is selected, for example, a display screen menu showing information which can be displayed on the CRT display device 2A which is the first display means is displayed on the CRT display device 2A as shown in FIG. 3. Information displayed on the CRT display device 2A is necessary information for the operator 5 as shown FIG. 1 who manipulates the manipulating and monitoring panel 1.

Screen information is displayed on the CRT display device 2A in the following manner.

An output signal of the display screen menu means 81 is inputted to an input data section 84. Upon taking in output signals of the display screen menu means 81 and manipulating signal decision means 83, the input data section 84 gains access to a knowledge base storage section 86. Among screen information so stored beforehand as to correspond to menus, screen information relating to a requested menu signal is outputted from the knowledge base storage section 86 to an output data section 85. Out of manipulating signals of the manipulating means 3A–3C, the manipulating signal decision means 83 selects a manipulating signal relating to the requested menu signal inputted from the display screen menu means 81 to the input data section 84. The output data section 85 compounds the output information of the knowledge base storage section 86 and output information of the manipulating signal decision means 83, and outputs the resultant composite signal to selecting means 88 and editing means 89. The selecting means 88 selects plant information relating to screen information outputted from the output data section and outputs the plant information thus selected to the editing means 89. The editing means 89 compounds the screen information supplied from the output data section 85 and output information supplied from the selecting means 88 and outputs the resultant composite signal to the CRT display device 2A as screen information which is necessary for the operator 5 of the manipulating and monitoring panel 1.

Concrete examples of display will now be described in detail.

In case manipulation of a control rod is to be executed, the operator first selects a key 2, for example, in the display screen menu means 81A. As a result, information of a control rod control system is outputted from the knowledge base storage section 86 to the selecting means 88 and the editing means 89 via the output data section 85. The plant information relating to the control rod control system and this information of the control rod control system are compounded. A resultant screen information is outputted to the CRT display device 2A. A picture shown in FIG. 6, for example, is displayed on the screen of the CRT display device 2A. The operator 5 gives instructions with respect to "manipulating mode", "drive mode", "sequence type" and "control rod No." by means of manipulation in the form of touch operation. Shaded portions of FIG. 6 display the result of manipulation conducted by the operator 5. As a result of selection of a control rod performed by the operator 5, the dark shading portions on the control rod coordinate diagrams shown on the left side of FIG. 6 indicate selected control rods in association with control rod addresses (such as 26-27, 26-35, 34-27 and 34-35). FIG. 6 shows an example of display on a CRT with touch operation. Since manipulating means are displayed, manipulation and information (such as information of drive states of control rods) obtained as a result of manipulation are outputted onto the same screen. It is a great convenience for the operator to confirm the manipulation state.

In this case, information may be distributed to the CRT display devices 2B–2G in addition to the CRT display device 2A and displayed on them.

On the basis of plant information (including an alarm signal), abnormality decision means 87 determines whether a plant abnormality is present or not. When an abnormality is present, the abnormality decision means 87 determines which system has the abnormality and outputs the result of decision to the input data section 84. If the abnormality decision means 87 judges an abnormality to be present, the input data section 84 gains access to the knowledge base storage section 86 to make it output screen information relating to the system wherein the abnormality occurs to the output data section 85. The editing means 89 compounds the screen information supplied from the output data section 85 and relating information supplied from the selecting means 88, and outputs the resultant composite signal to the CRT display device 2A. If an abnormality occurs in a feed water control system, the value of feed water, the number of revolutions of a feed water pump of turbine drive type and the state of a feed water pump of motor drive type for backup, for example, are displayed on the CRT display device 2A together with the system diagram of the feed water system. As a result, the operator 5 can easily judge what should be manipulated or what should be confirmed on the basis of this information. When an abnormality occurs in the plant 9, an automatic-manual changeover switch 82 functions to decide whether information relating to occurrence of an abnormality is to be automatically outputted to the CRT display device 2A or not. By switching the automatic/manual changeover switch to the manual side, menus displayed on the display screen menu means 81 can be selected.

On the CRT display device 2A, information directly needed when the operator 5 manipulates or monitor the plant is displayed.

Display on the large-screen display devices 4A and 4B forming the second display means will now be described.

Figure 4:
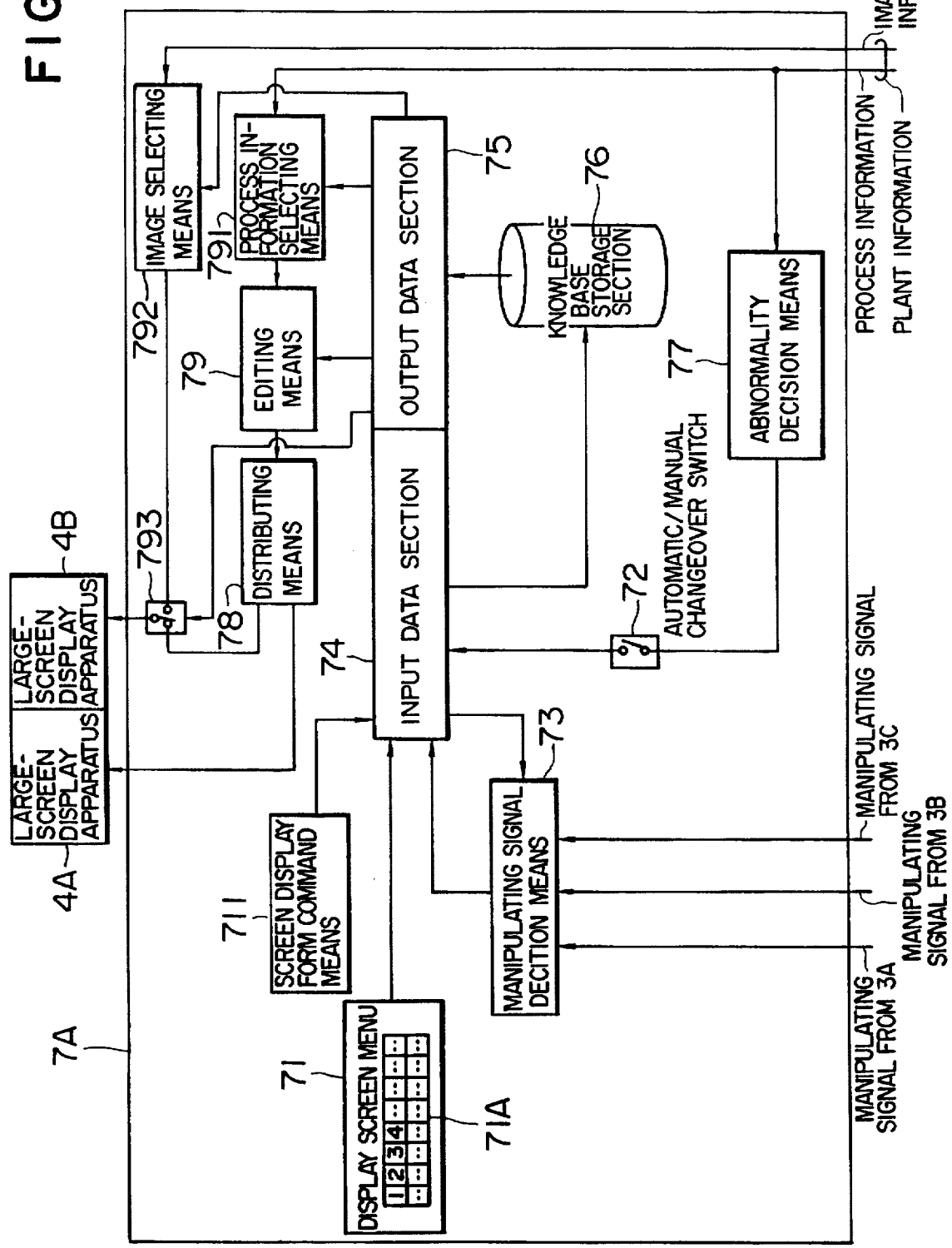
FIG. 4 is a configuration diagram showing an example of display data producing means of a large-screen display apparatus.

FIG. 4 shows an example of display data producing means 7A, 7B.

The display screen menu means 71 has a plurality of menus associated with function keys 71A as shown in FIG. 7. The display screen menu means 71 is functionally the same as the display screen menu means 81, but they differ in screen information associated with function keys. In case of FIG. 3, information directly needed for the manipulation of the operator 5 is assigned, whereas in case of FIG. 4, information for grasping the peripheral plant situation including the subject of manipulation manipulated by the operator 5 or the subject of monitoring, i.e., the operation situation of the plant as a whole is assigned.

The output signal of the display screen menu means 71 is inputted to an input data section 74. Upon taking in output signals of the display screen menu means 71 and manipulating signal decision means 73, the input data section 74 gains access to a knowledge base storage section 76. Among screen information pieces so stored beforehand as to correspond to menus, screen information relating to the requested menu signal is outputted from the knowledge base storage section 76 to an output data section 75. Out of manipulating signals of the manipulating means 3A–3C, the manipulating signal decision means 73 selects a manipulating signal relating to a signal inputted from the display screen display menu means 71 to the input data section 74. The output data section 75 compounds the output information of the knowledge base storage section 76 and the output information of the manipulating signal decision means 73, and outputs a resultant composite signal to process information selecting means 791 and editing means 79. The process information selecting means 791 selects process information relating to screen information outputted from the output data section 75, and outputs this process information to the editing means 79. The editing means 79 compounds the screen information supplied from the output data section 75 and the output information of the process information selecting means 791 and outputs a resultant composite signal to distributing means 78. In response to a distribution command signal supplied from the input data section 74, the distributing means 78 distributes these screen information pieces to two large-screen display devices 4A and 4B. The distribution command signal is produced by screen display form command means 711. This is predetermined in association with function keys similar to those of the display screen menu means 71. That is to say, how screen information is distributed to the large-screen display devices 4A and 4B is selected by the operator 5 and the manager 6. Screen information supplied from the distributing means 78 is outputted to the large-screen display devices 4A and 4B. FIG. 1 exemplifies the display screen. On the upper part of the large-screen display device 4A, rate of flow of core (xxxx T/H), important alarms and alarms for respective systems are displayed. On the other hand, generated output (xxxx MW), time information, and operation state message (such as manipulation situation of the operator and situation of start, shutdown and output change of the plant) are displayed on the upper part of the large-screen display device 4B. The general system of the plant and the plant state and process variable which are important in this system are so displayed as to spread over both large-screen display devices 4A and 4B. An expanded view of this portion is shown in FIG. 8.

Figure 8:
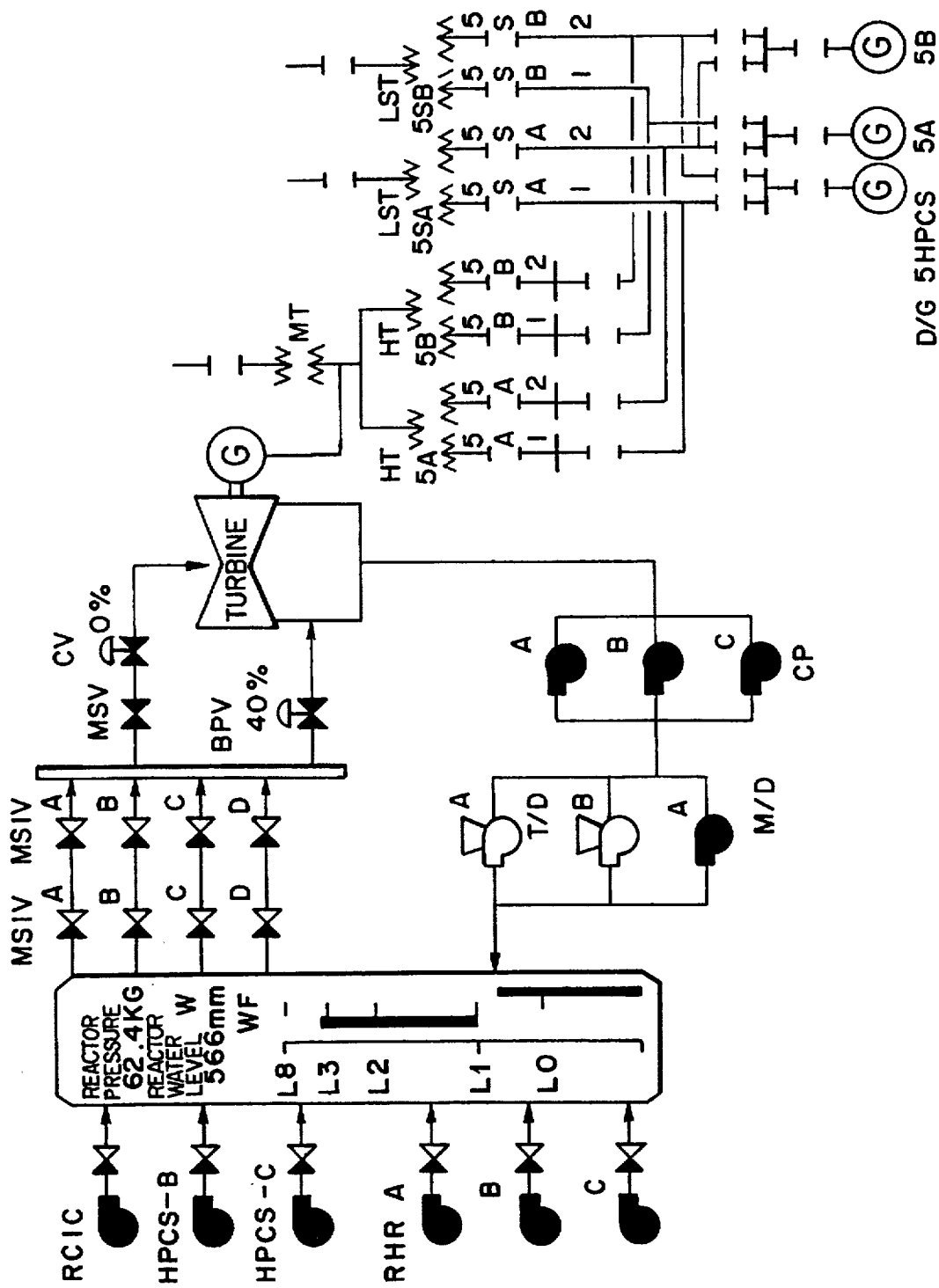

With reference to FIG. 8, RCIC (reactor core isolation cooling system), HPCS-B and HPCS-C (high-pressure core cooling system), and RHR-A, RHR-B and RHR-C (residual heat removal system) are information pieces relating to the safety system. They are information pieces for indicating the operation situation of that system. In the central position of the large-screen display device 4A, information of reactor pressure and reactor water level is displayed as important information relating to the nuclear reactor. MSIV denotes main steam isolation valves and opening/closing states of these valves are displayed. MSV denotes a main stop valve for intercepting steam inputted to a turbine. CV denotes a control valve for controlling the flow rate of steam inputted to the turbine. BPV denotes turbine bypass valves and represents the operation state of these valves. A generator G is coupled to the turbine. An electric system displayed laying stress on states of switches is connected to this generator G. T/D-A, T/D-B and M/D-A represent states of feed water pumps and CP represents states of condensate pumps. By indicating states of respective valves and pumps with colors, the opening/closing states of valves and the start/stop states of pumps can be easily judged.

By thus displaying the general system of a nuclear plant over a plurality of large-screen display devices 4A and 4B, even a person who is not close to the large-screen display devices 4A and 4B can easily understand contents of the plant state, resulting in enhanced visual recognition.

Figure 9A:
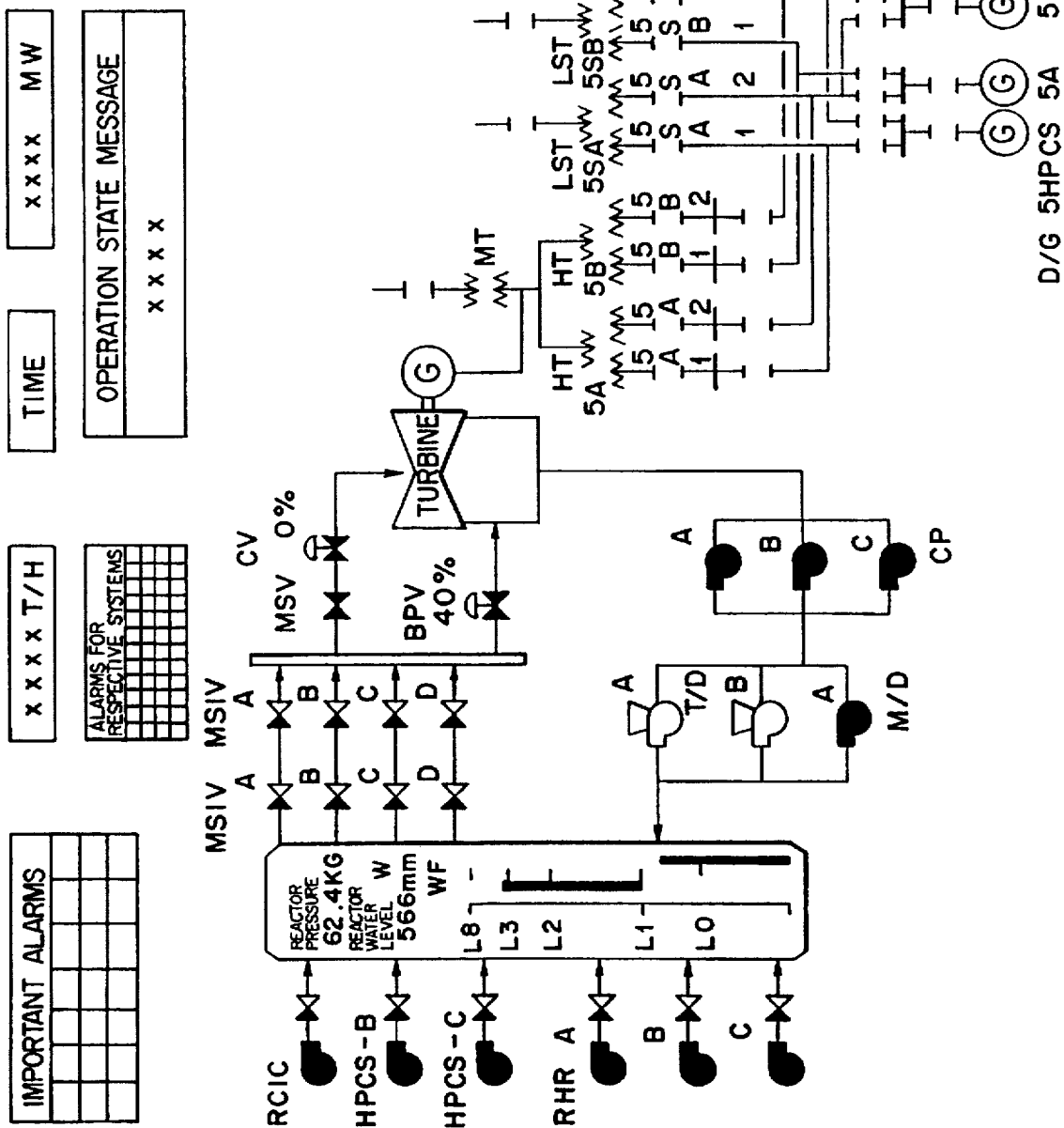
Figure 9B:
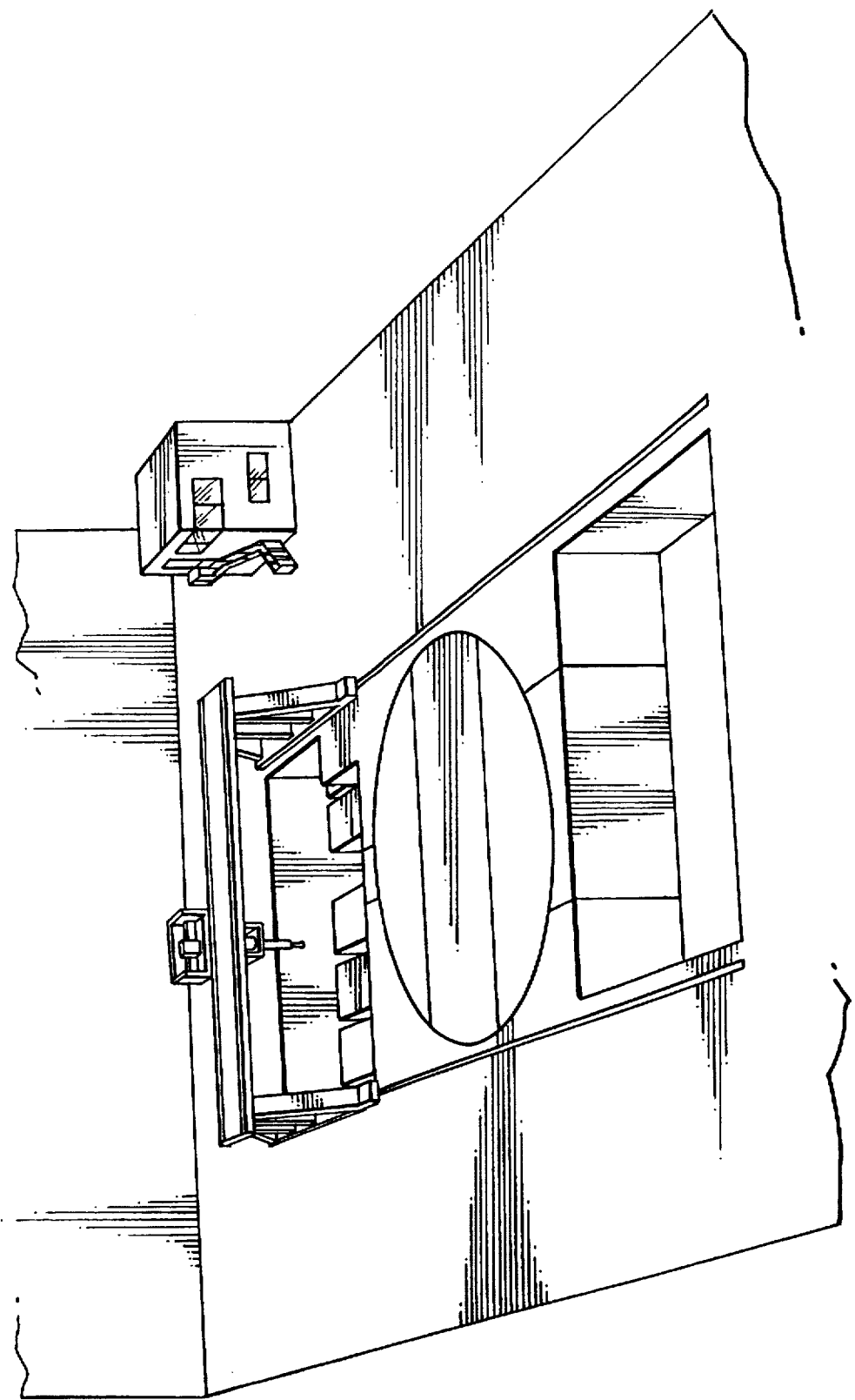

The display data producing means 7 can display the field situation of the plant on the large-screen display devices 4A and 4B as image information. By using the screen display form command means 711, a command signal for specifying the plant field to be monitored is taken into the input data section 74. This command signal is taken into image selecting means 792 via the output data section 75. On the basis of the command signal, the image selecting means 792 selects corresponding image information and outputs the image information to a changeover switch 793. In response to the command signal of the input data section 74, the changeover switch 793 is changed over to the image selecting means and image information is outputted to the large-screen display device 4A,4B. On the other hand, the input data section 74 outputs a command for preventing information supplied from the editing means 79 from being distributed to the distributing means 78. As a result the output signal of the editing means is outputted to the large-screen display device 4A. Examples of display at this time are shown in FIGS. 9(a) and 9(b). FIG. 9(a) is displayed on the large-screen display device 4A, and FIG. 9(b) is displayed on the large-screen display device 4B.

By thus displaying the situation of plant field on the large-screen display device as image information, a great number of people can grasp the plant state more easily and realistically.

The image information of plant field is displayed on the large-screen display device 4B. However, a display device for exclusive use of image information may be so installed as to be adjacent to these large-screen display devices and display only image information thereon.

Figure 14:
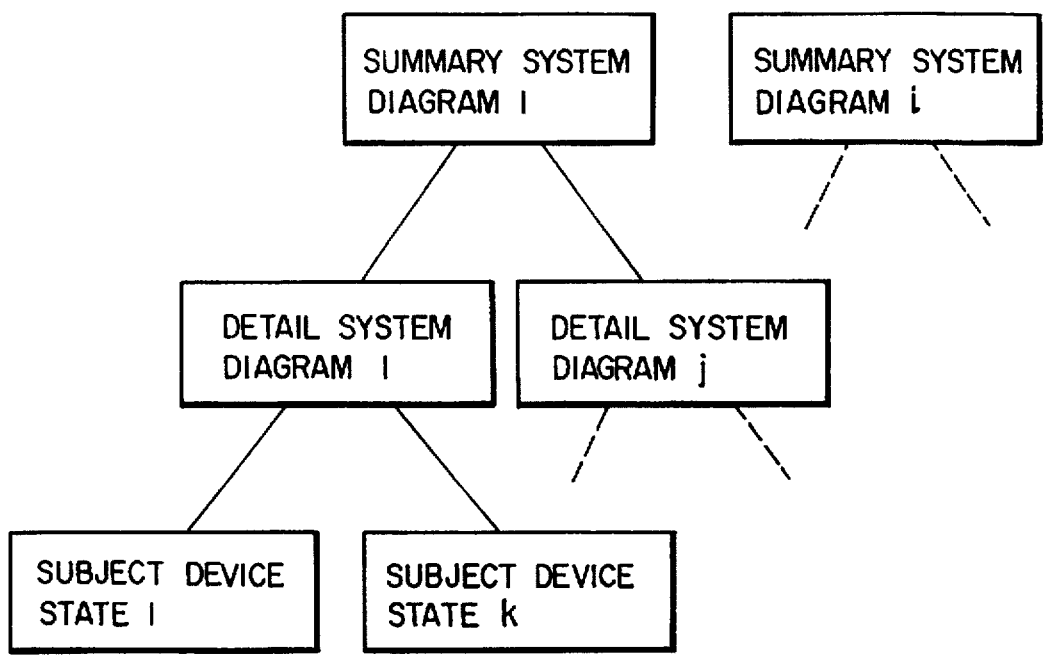
FIG. 14 is a diagram showing an example of hierarchical display on the CRT display devices.

In case image information is outputted to the large-screen display device 4B in FIG. 14, the amount of change of information displayed on the large-screen display devices 4A and 4B as well as change processing can be reduced by installing means for specifying a region on the large-screen display device 4B instead of the change-over switch 793. Since change portions of the displayed information are reduced, people watching screens of these large-screen display devices can easily determine which portions have changed.

Abnormality decision means 77 shown in FIG. 4 has the same function as that of the abnormality decision means 87 shown in FIG. 3. In the same way as the description with reference to FIG. 3, information as shown in FIGS. 10(a) and 10(b) can be displayed on the large-screen display devices 4A and 4B.

Figure 10A:
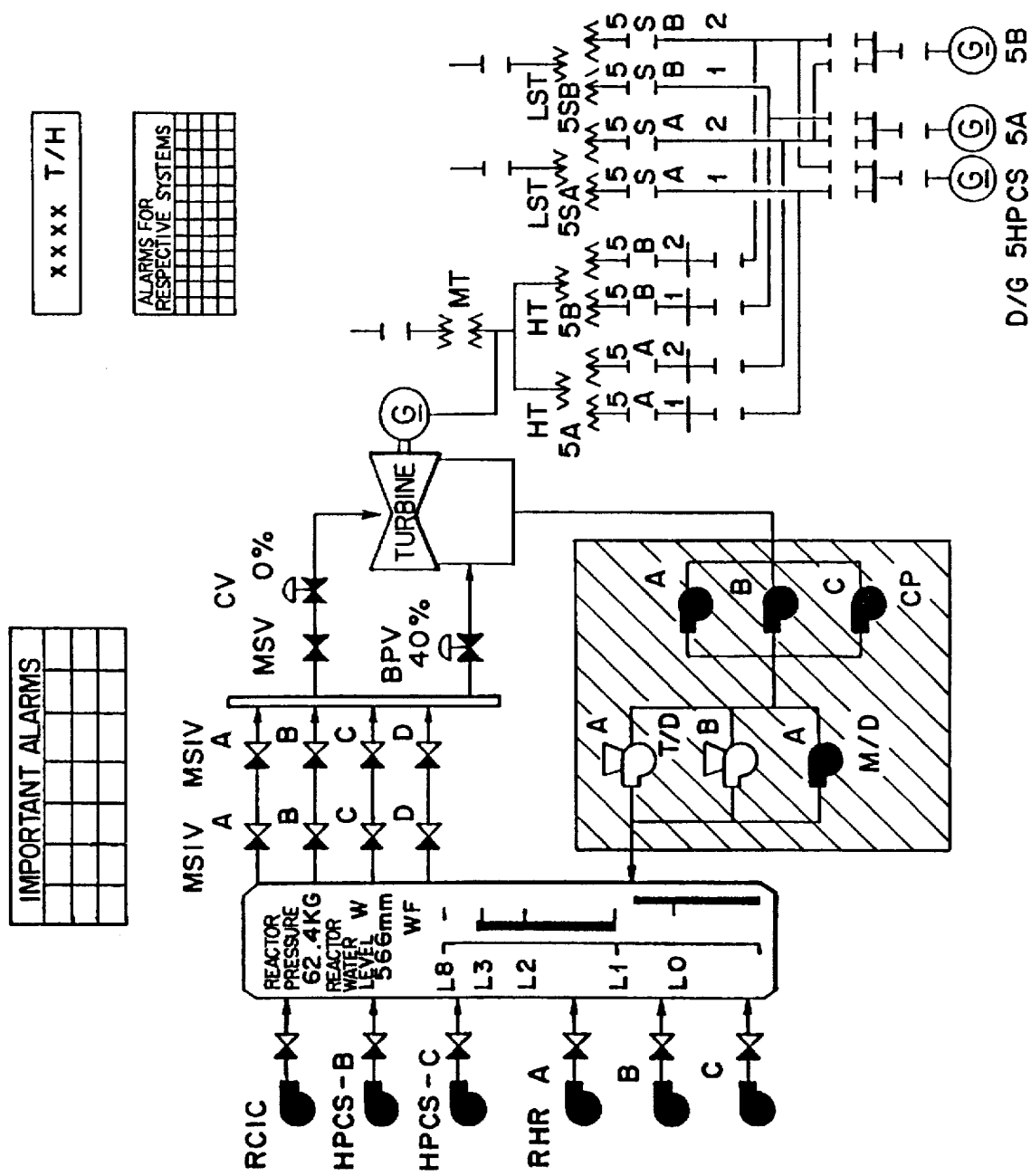
Figure 10B:
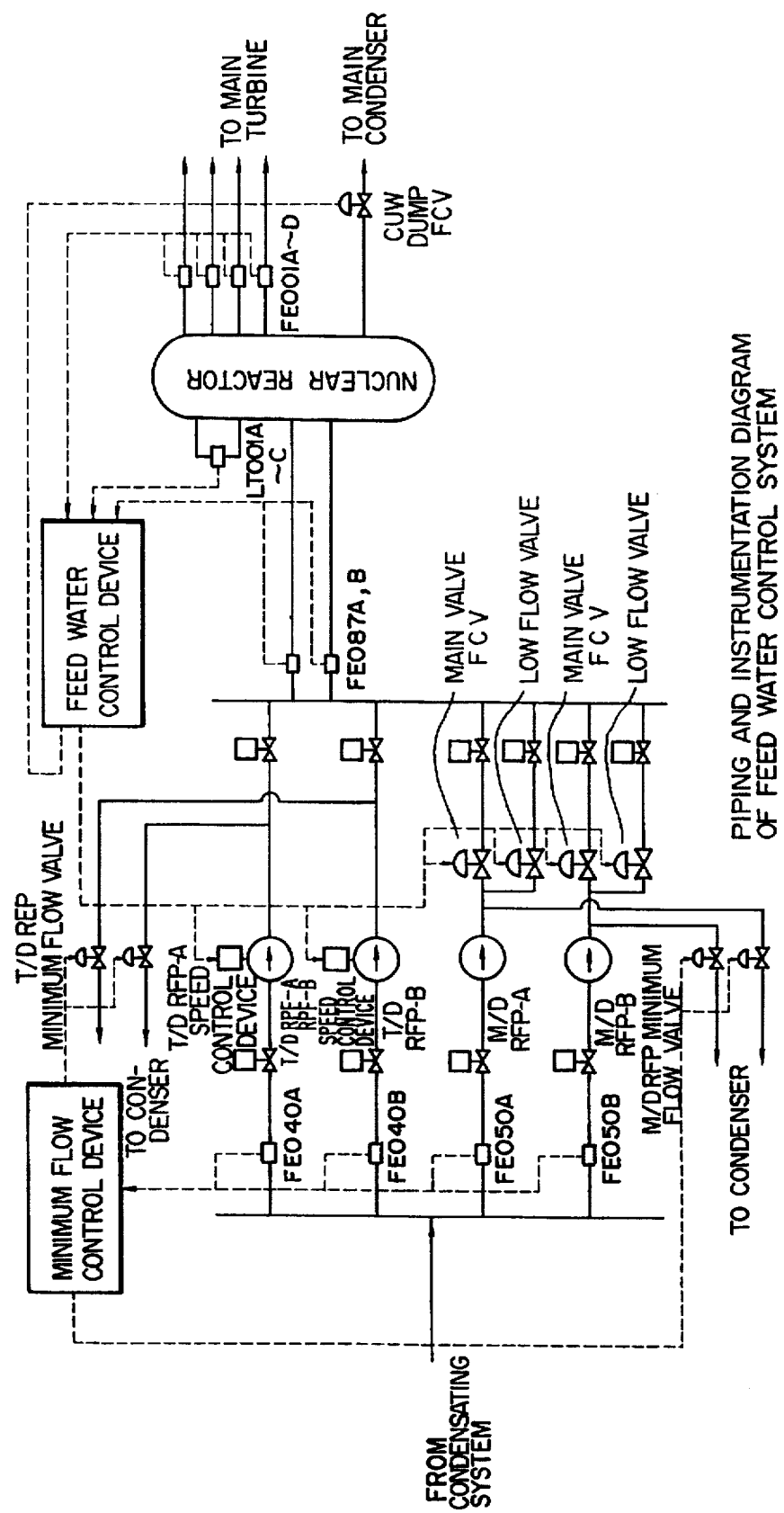

FIGS. 10(a) and 10(b) show the case where abnormality occurs in the feed water system as an example. At the time of normal operation, the general configuration diagram of the plant is displayed on the large-screen display devices 4A and 4B as shown in FIG. 1. If an abnormality occurs in such a display state, the general configuration diagram of the plant scaled down is displayed on the large-screen display device 4A as shown in FIG. 10(a) and a portion wherein a trouble has occurred (a shaded portion in FIG. 10(a)) is displayed with flashing or a color change. As shown in FIG. 10(b), detailed information (detailed configuration diagram and parameters) relating to the trouble portion is displayed on the large-screen display device 4B. By watching the large-screen display means having such display contents when an abnormality occurs in the plant, the operator, manager or another person can easily and systematically understand which portion a trouble has occurred in and the current state of that portion. Each person can obtain common recognition with respect to the abnormality of the plant. This also facilitates subsequent dealing.

By making the most of large-screen information and applying feedback to the manipulation information as heretofore described, the operator can perform manipulation more easily. In addition, a great number of people can understand the situation of the whole plant while understanding the situation of manipulation. While the CRT display devices forming the first display means and the large-screen display devices forming the second display means are complementing each other from the viewpoint of manipulation and monitoring, a great number of people can thus grasp information relating to the plant as significant information.

FIG. 11 shows an example of display on the CRT display device 2D and the large-screen display devices 4A and 4B in normal operation. On the large-screen display devices 4A and 4B, information is displayed so that the manager may grasp the history from the past on the basis of the current detailed plant situation. As an example of important information, the water level and pressure of the nuclear reactor are shown in FIG. 11 as trend information. The water level and pressure are displayed as a function of hour and day on the large-screen display devices 4A and 4B. On the other hand, the trend information is displayed on the CRT display device 2D as a function of second or minute so that the change may be seen every moment.

Figure 12:
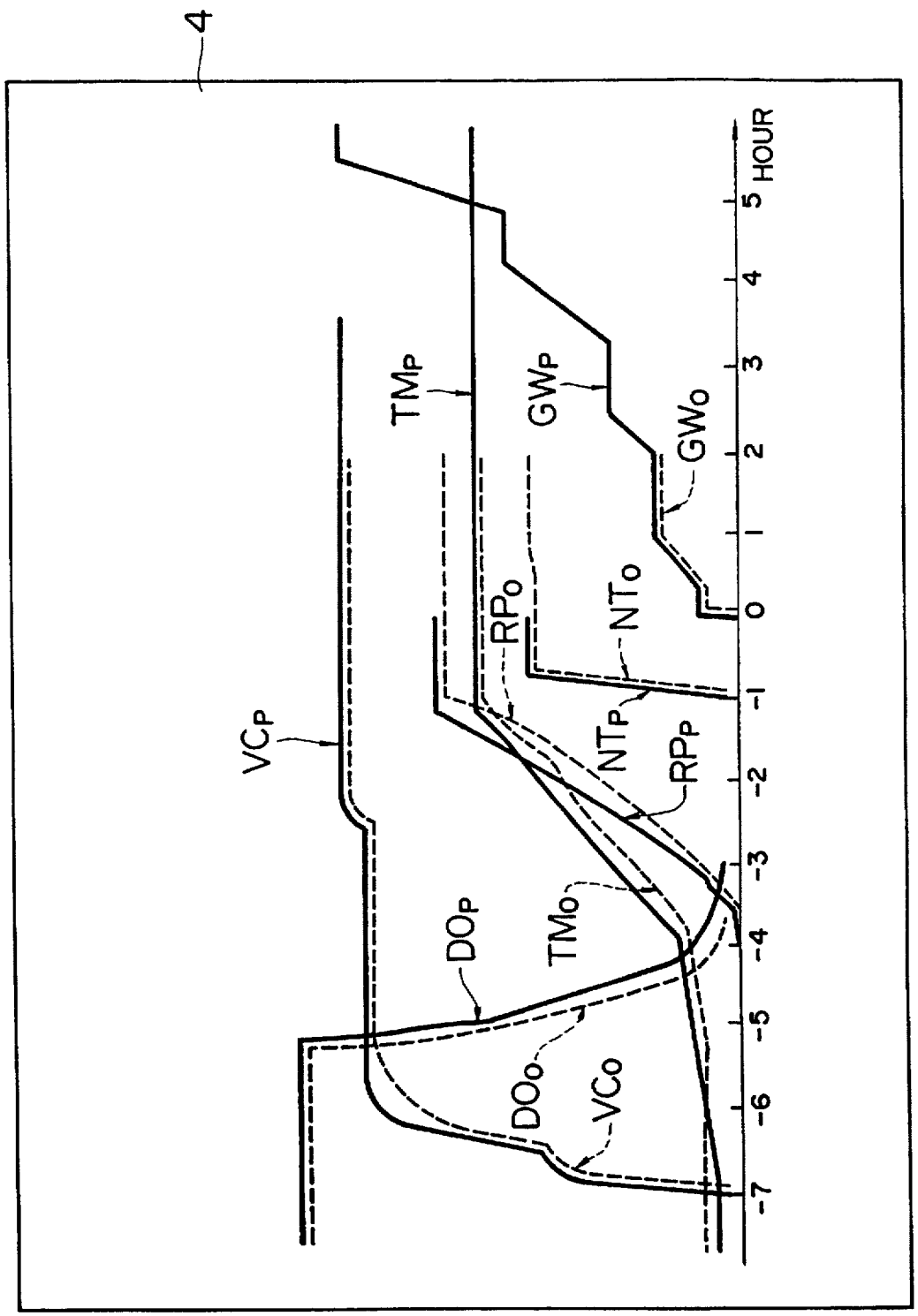

FIG. 12 shows an example of display of operation plan and actual operation results on the large-screen display device 4A,4B at the time of plant start. With reference to FIG. 12, $VC_p$ is a characteristic diagram showing the operation plan of the degree of vacuum of the condenser, $DO_p$ a characteristic diagram showing the operation plan of concentration of oxygen dissolved in reactor water, $RP_p$ a characteristic diagram showing the operation plan of pressure of the nuclear reactor, $TM_p$ a characteristic diagram showing the operation plan of temperature of reactor water, $NT_p$ a characteristic diagram showing the operation plan of the number of revolutions of the turbine, and $GW_p$ a characteristic diagram showing the operation plan of the generator plan. These characteristics of operation plans are inputted from the manipulating means 3A–3C by the operator before the plant start, edited by computers incorporated in the display data producing means 8A–8C, and set. $VC_o$ represented by a broken line is an actual characteristic diagram showing the progress of the degree of vacuum of the condenser until then, $DO_o$ an actual characteristic diagram showing the progress of concentration of oxygen dissolved in reactor water until then, $RP_o$ an actual characteristic diagram showing the progress of pressure of the nuclear reactor until then, $TM_o$ an actual characteristic diagram showing the progress of temperature of reactor water until then, $TN_o$ an actual characteristic diagram showing the progress of the number of revolutions of the turbine until then, and $GW_o$ an actual characteristic diagram showing the progress of generator output until then. By taking the time whereat generators are scheduled to be connected in parallel to supply power from the plant as zero on the time axis, FIG. 12 shows the state whereat the plant operation arrives until approximately three hours elapse since parallel connection.

A plurality of important parameters of both plan and actual results of plant situation at the time of plant start are displayed on the large-screen display device 4 in a trend form. Therefore, the manager and other operators, not to mention the operator manipulating the manipulating and monitoring panel 1 can accurately grasp the plant situation. Further, it is possible to make the knowledge relating to the plant state common to these operators and the manager. Even if the operator is alternated, therefore, the operation can be continued without any puzzlement. Further, even if the operator temporarily leaves the place, the state from the past can be easily grasped because the display information is plant summary information which is long in time.

Figure 13:
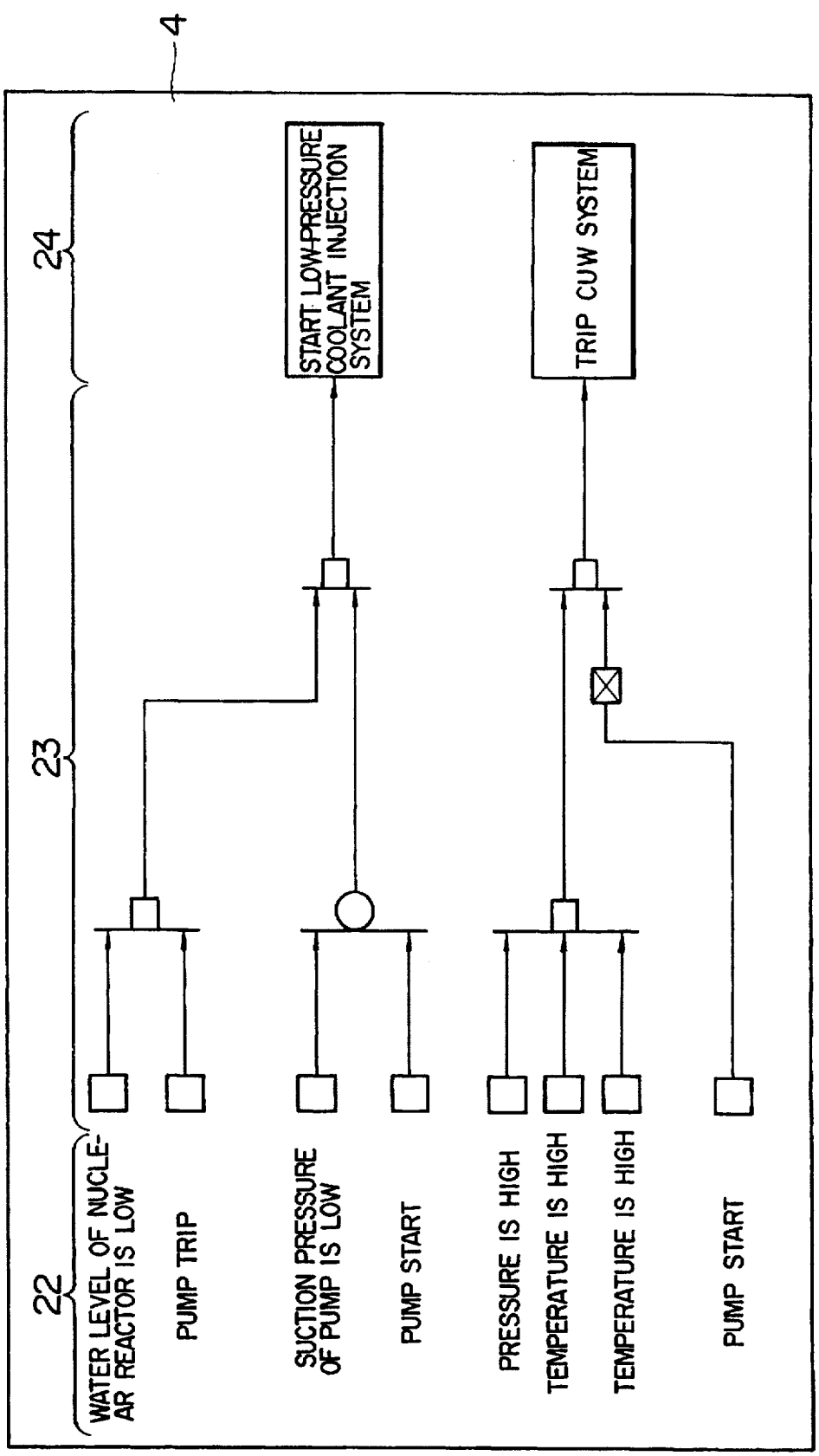

FIG. 13 shows a display example of a picture for confirming the operation sequence of a guard interlock circuit of the plant displayed when an abnormality occurs in the plant. With reference to FIG. 13, numeral 22 denotes names of signals for actuating the interlock circuit, numeral 23 components of the interlock circuit, and numeral 24 results obtained when the interlock circuit is activated. With reference to FIG. 13, the display data producing means 8A and 8B judge interlock operation contents 23 on the basis of the states of the signal 22 and display whether the result is established or not with colors. In the same way as the time of start or shutdown, display of the screen when an abnormality was occurred is changed over at a request of the operator or the manager.

The operator sometimes desires to see detailed information on the CRT display device 2A–2G. By presenting hierarchical display as shown in FIG. 14 in this case, the operator can understand the situation more easily and accurately and can execute the corresponding manipulation. FIG. 14 shows an example of hierarchical expression of system diagrams and device states. In the same way, manipulation procedures and other information can also be displayed hierarchically. This is preduced by the display data producing means 8A–8G.

Display contents of the CRT display device 2 and the large-screen display device 4 have heretofore been described. Placement relations of the backup monitoring panel having the manipulating and monitoring panel 1 and the large-screen display device 4 installed thereon will now be described.

Figure 15:
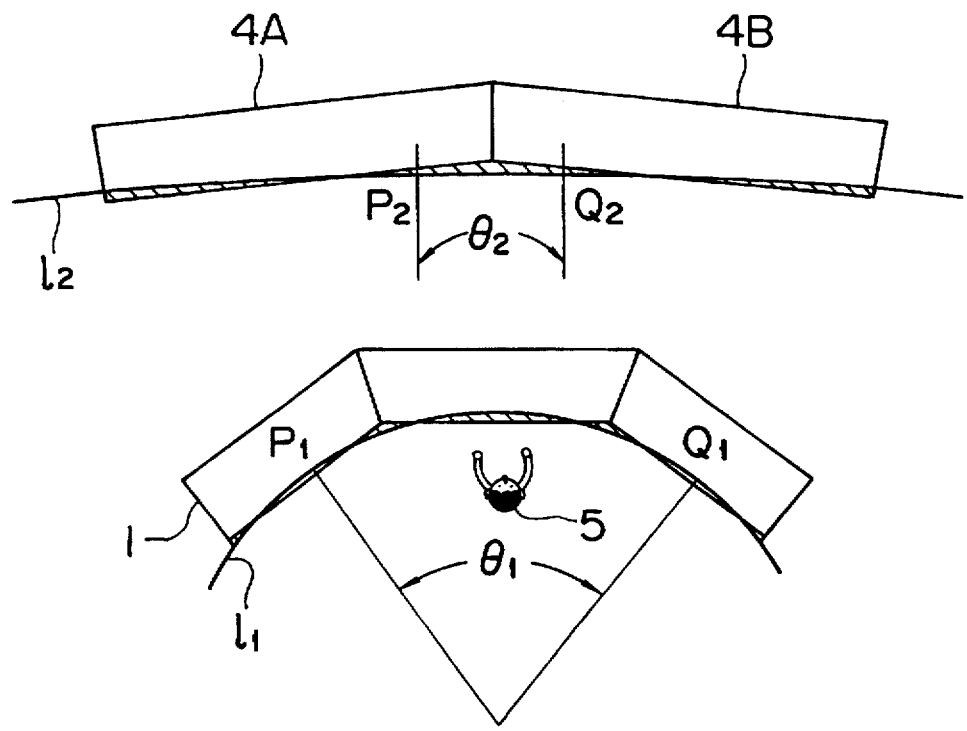
FIG. 15 is a diagram showing the positional relation between a manipulating and monitoring panel and a backup monitoring panel.

FIG. 15 shows placement relations of the manipulating and monitoring panel 1 and the large-screen display devices 4A and 4B. Viewing from the operator 5, the large-screen display devices 4A and 4B are installed behind the manipulating and monitoring panel 1. It is now assumed that $l_1$ denotes the average curve linking displays on the manipulating and monitoring panel 1 and $l_2$ denotes the average curve linking surfaces of the large-screen display devices 4A and 4B. Structure relations of the large-screen display devices with respect to the manipulating panel 1 are so determined that the radius of curvature of $l_2$ may not be smaller than the radius of curvature of $l_1$.

Let two points whereat the display surface comes in contact with the curve $l_1$ be $P_1$ and $Q_1$, and let an angle subtended by lines respectively perpendicular to two tangential lines be $\theta_1$. Radius $R_1$ of curvature of the curve $l_1$ is represented as $$R_1 = \frac{dS_1}{dQ_1} \tag{1}$$

where $S_1$ is the length of an arc between the points $P_1$ and $Q_1$.

In the same way, the radius $R_2$ of curvature of the curve $l_2$ is represented by the following equation.

$$R_2 = \frac{dS_2}{dQ_2} \tag{2}$$

If the manipulating and monitoring panel 1 and the large-screen display devices 4A and 4B are thus configured, the manager and other operators existing behind the operator 5, not to mention the operator 5 manipulating the manipulating and monitoring panel 1 can see the summary of manipulation of the operator 5 in association with the display contents of the large-screen display devices 4A and 4B. Therefore, they can easily understand the situation of the plant. In addition, they can judge to some extent how the operator 5 is manipulating. Especially, a person existing immediately behind the operator 5 and watching the display contents of the large-screen display device can understand the manipulation of the operator 5 well.

With reference to FIG. 15, the curve $l_1$ is so determined that the mean square of distance between the display panel of the manipulating and monitoring panel 1 and the curve $l_1$ may be minimized. The curve $l_2$ is so determined that the mean square of distance between the display panel and the large screen display device 4A/4B and the curve $l_2$ may be minimized. As a matter of course, however, various modifications may be used without departing from the present spirit.

In the above described example, two large-screen display devices are installed. However, the number of the large-screen display devices may be 1, 3 or another integer. It is a matter of course that the manipulating and monitoring panel 1 is not limited to the row of three panels shown in FIG. 15.

Figure 16:
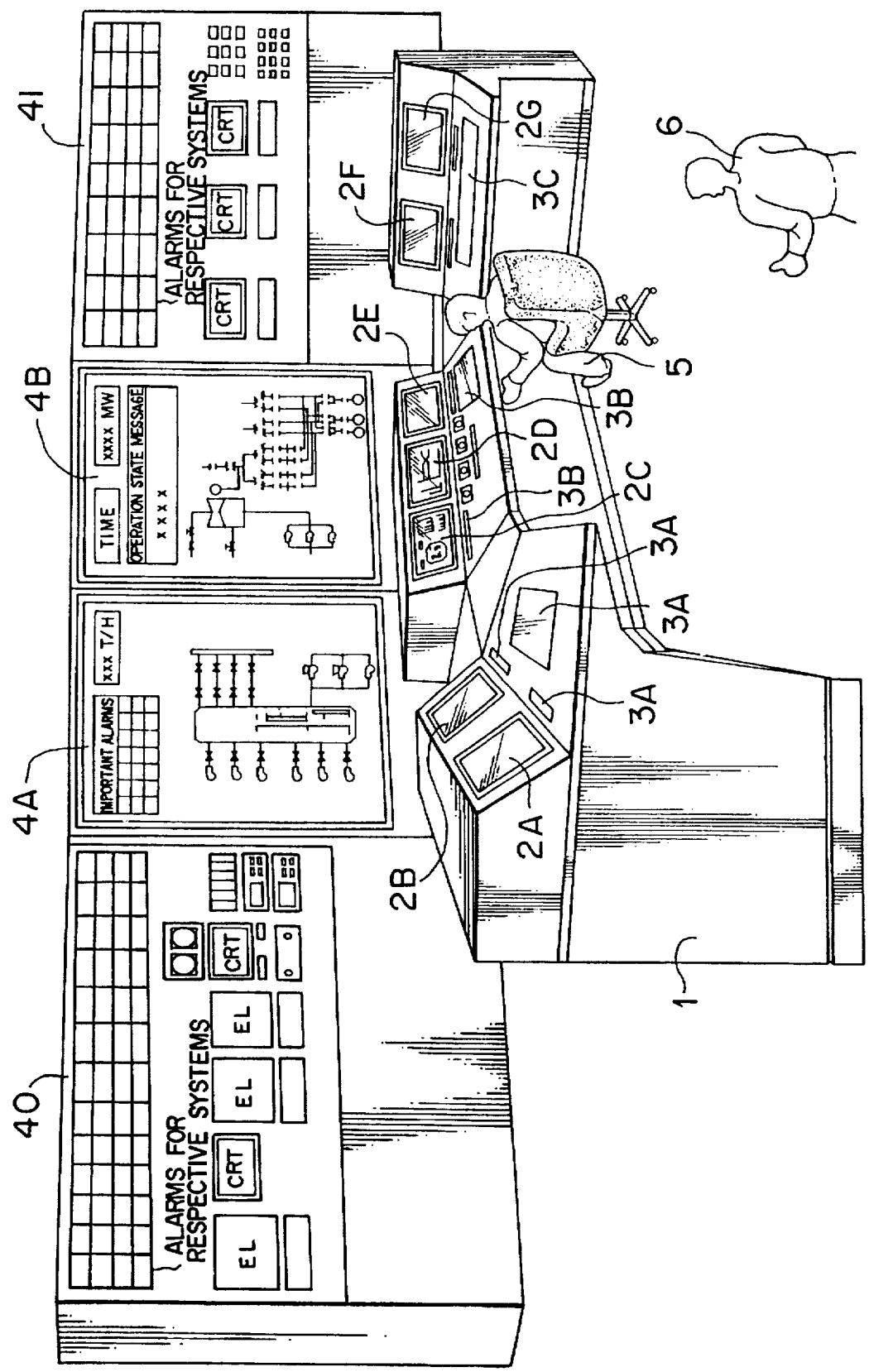
FIG. 16 is a general configuration diagram showing another embodiment of the present invention.

FIG. 16 shows another embodiment of the present invention. In the embodiment shown in FIG. 16, a backup panel 40 of safety system whereon manipulation relating to the safety of the plant can be conducted and a backup panel 41 of normal system whereon manipulation relating to the normal operation of the plant can be conducted are juxtaposed with a backup monitoring panel comprising the large-screen display device 4.

Manipulating means of the manipulating and monitoring panel 1 comprises a combination of manipulating switches and touch operation devices of the CRT display device 2. The latter ones have a far more manipulating functions. Thereby the size of the manipulating and monitoring panel is reduced. This function is achieved by computer processing. If the computer fails, however, this function is lost and plant operation is disabled. In order to prevent this, reliability is improved by providing computers with redundancy. In order to implement a plant system having higher reliability, however, backup panels 40 and 41 are provided.

The backup panel 40 of safety system comprises manipulating means whereby principal manipulation relating to the safety of the plant can be conducted and display means (including indicators) capable of displaying information relating to the safety of the plant. In addition, the backup panel 40 of safety system is so configured that surveillance test for testing whether devices and systems relating to the safety of the plant are sound or not may be executed. The backup panel 41 of normal system comprises manipulating means whereby principal manipulation relating to the normal operation of the plant can be conducted and display means (including indicators) capable of displaying principal parameters of the plant. In addition, the backup panel 41 of normal system is so configured that surveillance test for testing whether devices and systems relating to the normal operation of the plant are sound or not may be executed.

Figure 17:
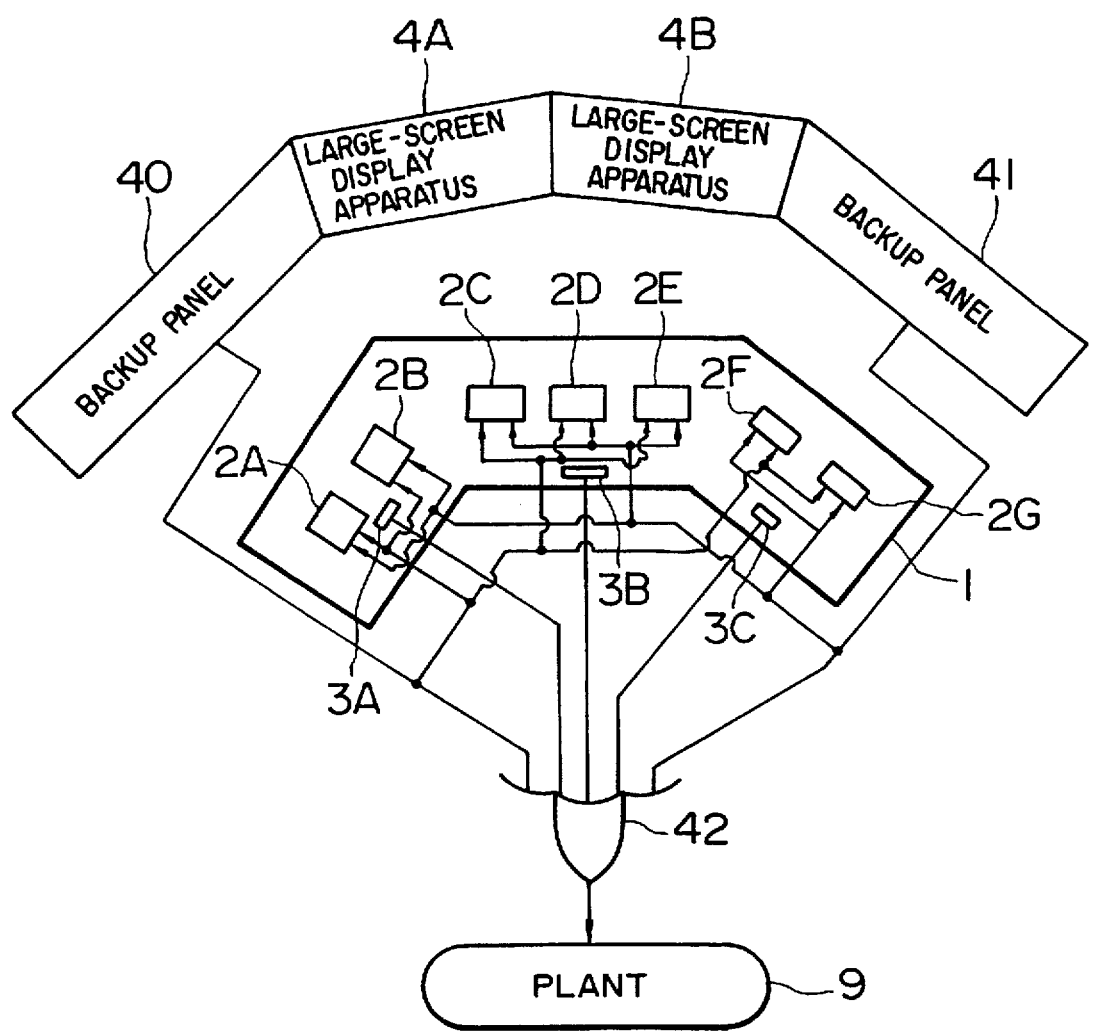
FIG. 17 is a diagram showing the signal delivery and receipt relations of the embodiment shown in FIG. 16.

Relations in manipulation of the backup panels 40 and 41 with respect to the manipulating and monitoring panel 1 are shown in FIG. 17. Manipulation commands from the backup panel 40 of safety system, the backup panel 41 of normal system and the manipulating and monitoring panel 1 are outputted to the plant 9 via logical sum means 42. Further, manipulation commands of the backup panel 40 of safety system and the backup panel 41 of normal system are taken into the manipulating and monitoring panel 1 to make it possible to execute state monitoring. Especially when the surveillance test is executed by using the backup panels 40 and 41, state monitoring can be executed on the manipulating and monitoring panel 1 as well as hence the situation grasp of the plant is further improved.

As illustrated, the backup panel 40 of safety system and the backup panel 41 of normal system are installed behind the manipulating and monitoring panel 1. At the time of surveillance test, therefore, the operator 5, the manager 6 and other operators can see what sort of test manipulations are conducted by a testing person. Therefore, it is possible to easily confirm what sort of surveillance test is being executed or whether an error is present in manipulation or not. Reliability of the plant operation can be further improved.

In the present example shown in FIG. 16, the backup panel 40 of safety system and the backup panel 41 of normal system are so juxtaposed with the large-screen display devices 4A and 4B as to sandwich them. Since those backup panels are physically separated, the operators and the manager can distinguish one of those backup panels from the other.

Figure 18:
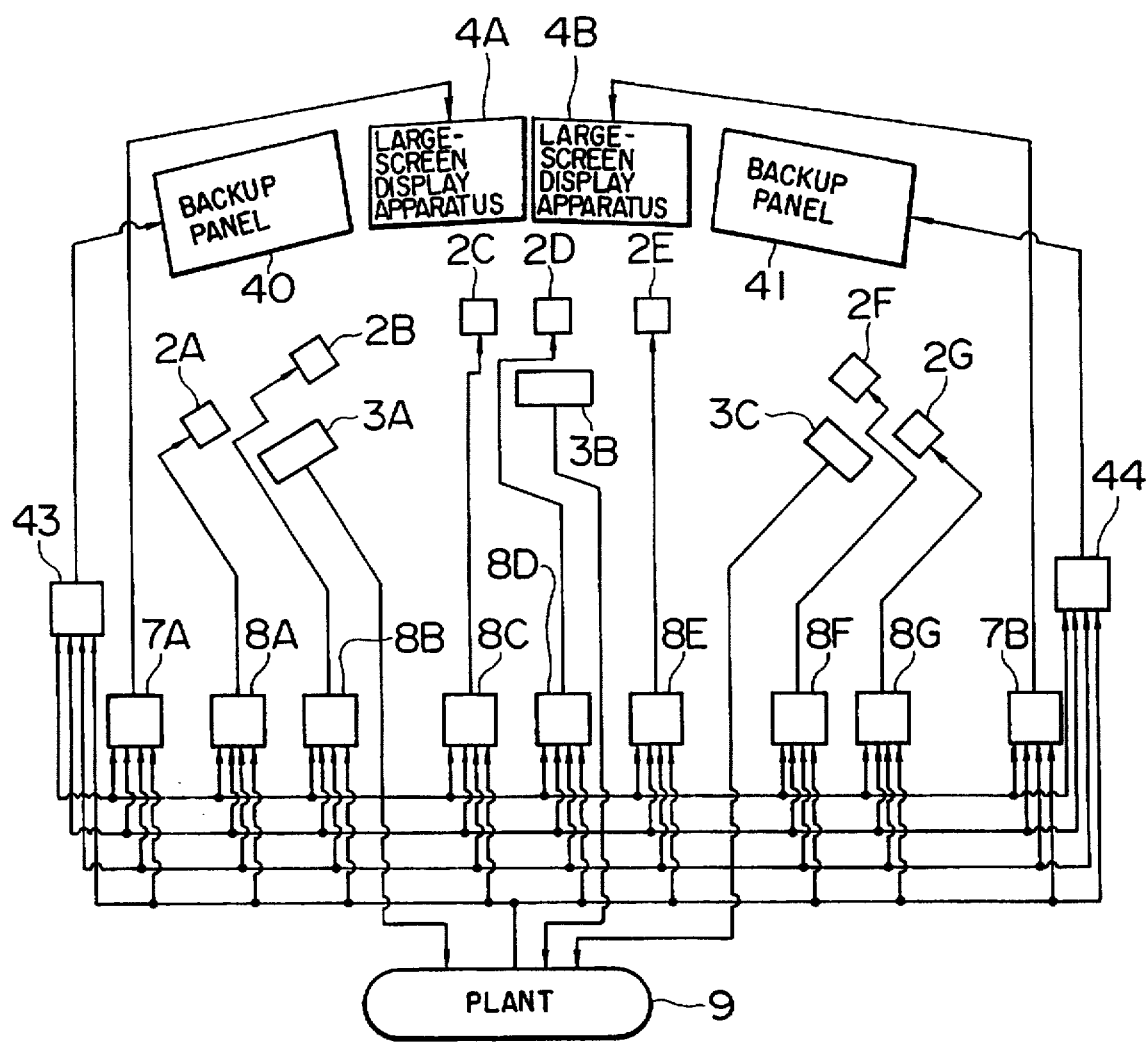
FIG. 18 is a configuration diagram showing an example of a display control device in the embodiment of FIG. 16.

Input information to the backup panel 40 of safety system and the backup panel 41 of normal system are produced by converting data of the plant 9 and the manipulating means 3A–3C into display data in display data producing means 43 and 44 as shown in FIG. 18.

Figure 19:
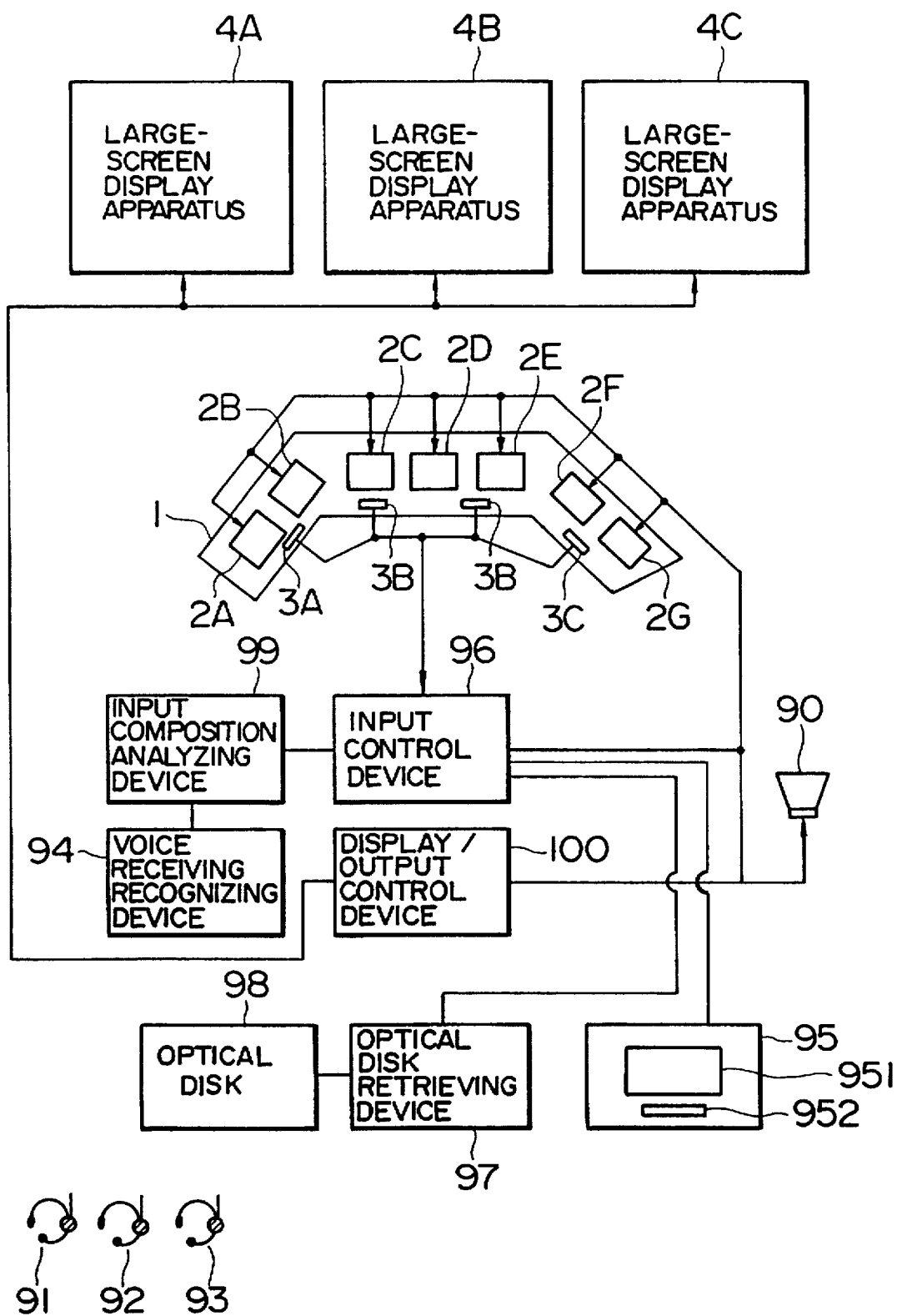
FIG. 19 is a configuration diagram showing an example of application of the present invention.

FIG. 19 shows an example of application of the present invention to a manipulating and monitoring device of interrogation-response type. With reference to FIG. 19, 4A–4C denote large-screen display devices. In this example, three large-screen display devices are installed. Numeral 90 denotes a speaker, and a numerals 91–93 denote wireless microphones of headphone type. Transmission frequencies of the wireless microphones 91–93 are changed from microphone to microphone. A voice receiving and recognizing device 94 can discriminate the microphone transmitting the signal. Numeral 95 denotes a maintenance console, and numeral 951 denotes its CRT display device. Numeral 952 denotes an input keyboard and a mouse.

Inputs from the manipulating means 3A–3C, inputs from the CRT display devices 2A–2G by means of touch operation, and inputs from the keyboard and mouse 952 of the maintenance console 95 are taken into an input control device 96 and outputted to a display/output control device 100, an optical disk retrieving device 97, or the maintenance console 95 as instructions. An optical disk 98 stores information relating to maintenance procedures and repair procedures including drawing, photographs and characters.

Voice input signals from the wireless microphones 91–93 are received and recognized by the voice receiving and recognizing device 94 and transmitted to an input composition analyzing device 99 as a character train. The input composition analyzing device 99 analyzes the meaning of this character train, converts it into instructions for devices including the above described display/output control device 100, and outputs the resultant instructions.

FIG. 20 shows examples of operation of respective devices shown in FIG. 19. Operation of the operator and operation of relating information presenting devices conducted when an abnormality has occurred in the instrumentation control system of the plant are shown in FIG. 20.

When a diagnostic program within the maintenance console senses the occurrence of an abnormality, diagnosis for locating the abnormal portion is started. A message of this diagnosis start is given by the CRT display device 951 included in the maintenance console 95 and voices. At the time of start, diagnosis is executed by using automatically collected information. However, there may be a situation wherein the abnormal portion cannot be located by using the automatically collected information alone. In the example shown in FIG. 20, this situation occurs and manual information inputting becomes necessary. Therefore, it is requested to input necessary information by the CRT display device 951 in the maintenance console 95 and voices. In response to this, an operator 5A taking charge of maintenance inputs answer information with respect to the request information. With reference to FIG. 20, voltage of a certain device is measured and "4.0 V", for example, is inputted. By this information, location of the failure portion is finished. A message information of this is outputted by means of the CRT display device 951 and voices.

If the diagnosis is finished, work for checking the validity of the result by all operators of the manager is started. First of all, the operator 5A inputs "Display the progress of diagnosis on large-screen display device 4A." by means of voices. This voice input is converted into an instruction for the display/output control device 100 by the voice receiving and recognizing device 94 and the input composition analyzing device 99. Upon receiving this instruction, the display/output control device 100 successively displays the progress of diagnosis on the large-screen display device 4A. In the course of study of diagnosis results conducted by all operators and the manager, "Display the configuration diagram of feed water system" is inputted by means of voices in order to show the configuration diagram of the feed water system to all operators and the manager. In response to this, the configuration diagram of the feed water system is displayed on the large-screen display device 4A. The input composition analyzing device 99 has a dialogue history record, and insufficient information of the input composition is complemented by this storage.

The diagram displayed on the large-screen display devices 4A–4C is studied by all operators and the manager. It is now assumed that it becomes necessary in the course for the operator 5B to confirm the value of feed water flow. The operator 5B inputs "Display feed water flow on the CRT display device 2C." and confirms the value of feed water flow on the CRT display device 2C. When the value of a state variable is inquired, the display/output control device 100 outputs the value by means of voices. By means of voices, therefore, "feed water flow is 6300 t/h" is simultaneously outputted. As a result, all the operators and the manager are capable of knowing the value of feed water flow.

It is now assumed that in the course of study among operators or managers it has become necessary for all the members to see the system diagram of the feed water turbine system. Therefore, an operator 5C inputs "Display the feed water turbine system diagram on the large screen" by means of voices, and the diagram is displayed on the large-screen display device.

If the study of diagnosis results is finished, the operator 5A goes back to the maintenance console 95 and starts preparation of repair of the failure portion. If "Display repair procedure on the maintenance console" is inputted, this input is converted into a processing instruction to be supplied to the optical disk retrieving device 97 by the voice receiving and recognizing device 94 and the input composition analyzing device 99. In response to this, the optical disk retrieving device 97 performs retrieval on the optical disk 98 and displays the repair procedure on the CRT display device by means of photographs, drawing and composition. Thereafter, the operator 5A make inquiries of various kinds of information for repair through the maintenance console.

The instrumentation control system is typically multiplexed. When the above described diagnosis is made, the operation of the plant is continued by activating a stand-by system.

In the example of FIG. 19, voices are used in all cases. However, the same input operation may be conducted by using manipulating means, a keyboard and a mouse.

By thus applying the present invention to a manipulating and monitoring device of interrogation response type, all operators or managers are able to study the result of diagnosis while they are consulating together. At that time, information needed by all members and information needed by individuals can be separately outputted to suitable information presenting devices. Further, since the operators can consult together while they are freely moving in the control room, study of diagnosis results can be efficiently executed. Further, since an optical disk has a large storage capacity and readout of information stored therein can be performed at high speed, information including photographs and drawing can be efficiently used. Further, since an optical disk has a large storage capacity, sequence diagrams of electric system and mechanical system diagrams of piping and devices frequently used at the time of occurrence of an abnormality in a plant can be stored page by page as they are.

In FIG. 19, signal lines are represented by single lines for brevity.

We claim:

1. An apparatus for operating and monitoring a plant, comprising:
    manipulating and monitoring panel means, including manipulating means and a first display device, for operating the plant which includes a plurality of systems;
    first display data producing means for displaying on said first display device plant information needed for an operator to perform manipulation or monitoring of components constituting the plant by said manipulating means;
    second display device, placed behind said manipulating and monitoring panel means and having a display screen whose size is larger than a size of a display screen of said first display device, for displaying a general configuration diagram of the plant and process variables indicative of operation states of said components of the plant;
    abnormality decision means for determining, when an abnormality occurs in the plant, a system wherein the abnormality has occurred; and
    second display data producing means controlling a display content of said second display device,
    wherein said second display data producing means controls said second display device in a manner that, when the plant is in a normal state, said second display device displays said general configuration diagram of the plant and said process variables, and when an occurrence of an abnormality in the plant is determined by said abnormality decision means, said second display device displays an alarm for each of said systems in which an abnormal condition has occurred in addition to said general configuration diagram of the plant and said process variables.

2. An apparatus for operating and monitoring a plant according to claim 1, wherein said second display data producing means controls said second display device in a manner that, when the occurrence of abnormality in the plant is determined by said abnormality decision means, said second display device displays detailed information relating to the abnormality of said plant in addition to the alarm for each of said systems in which an abnormal condition has occurred, said general configuration diagram of the plant and said process variables.

3. An apparatus for operating and monitoring a plant according to claim 2, wherein said second display data producing means controls said second display device in a manner that said second display device displays said detailed information relating to the abnormality of said plant in an area formed on said display screen of said second display device resulting from a reduction in size of said general configuration diagram of the plant being displayed when the abnormality has occurred.

4. An apparatus for operating and monitoring a plant according to claim 1, wherein said second display data producing means controls said second display device in a manner that said second display device further displays predetermined important alarms.

5. An apparatus for operating and monitoring a plant according to claim 1, wherein said second display data producing means controls said second display device in a manner that said second display device further displays an operation state message corresponding to an operation state of said plant such as a manipulation by an operator operation state, a start operation state, a shutdown operation state and an output change of said plant operation state.

6. An apparatus for operating and monitoring a plant according to claim 1, wherein said second display data producing means controls said second display device in a manner that said second display device displays said general configuration diagram of the plant indicating an operation plan of monitoring parameters of said plant and said general configuration diagram of the plant indicating an operation result of monitoring of said monitoring parameters of said plant.

7. An apparatus for operating and monitoring a plant according to claim 1, wherein said second display device includes a plurality of second display portions each having a display screen with a size larger than a size of said display screen of said first display device, said second display data producing means controls said second display device in a manner that one of said plurality of second display portions displays said general configuration diagram of the plant by reducing in size information now being displayed on said plurality of second display portions, and the other of said plurality of second display portions display monitoring image information selected by image selecting means.

8. An apparatus for operating and monitoring a plant according to claim 1, wherein said second display device includes a variable information display area and a fixed information display area, said second display data producing means controls said second display device in a manner that said variable information display area displays various kinds of variable information in accordance with a varying state of said plant and said fixed information display area continually displays various kinds of fixed information including said general configuration diagram of the plant, said process variables, said alarms for said plurality of important alarm being defined as alarms which are important for monitoring the plant and each of said alarms for said plurality of systems being defined as an alarm which is indicative of occurrence of at least one alarm in each of said systems.

9. An apparatus for operating and monitoring a plant according to claim 8, wherein said second display data producing means controls said second display device in a manner that said variable information display area further displays at least one of detailed plant state information and a detailed configuration diagram of the plant indicating an abnormal state of the plant.

10. An apparatus for operating and monitoring a plant according to claim 8, further comprising:

means for changing contents of said variable information display area in response to voice commands.

11. An apparatus for operating and monitoring a plant according to claim 1, wherein said second display device includes a first display portion and a second display portion, said second display data producing means controls said second display device in a manner that said second display device displays said general configuration diagram of the plant and said process variables on said first and second display portions at a time of normal operation of the plant, and said second display device displays said general configuration diagram of the plant on said first display portion by reducing in size said general configuration diagram of the plant and displays said detailed information relating to the abnormality of the plant on said second display portion when an abnormality has occurred.

12. An apparatus for operating and monitoring a plant according to claim 1, further comprising:

safety backup panel means, including manipulation means for manipulating said plant to conduct surveillance test, for testing safe operation of safety control equipments capable of conducting principle manipulation relating to safety of the plant; and normal backup panel means, including manipulation means for manipulating said plant to conduct surveillance test, for testing a normal operation of said control equipments capable of conducting principal manipulation relating to normal operation of the plant.

13. An apparatus for operating and monitoring plant according to claim 1, further comprising:

a maintenance diagnostic device for making a maintenance diagnosis on the plant, said maintenance diagnostic device including voice input means for inputting voice information from an operator, input means for inputting manipulation information by manual manipulation by an operator and input composition analyzing means for recognizing as a character train said voice information and said manipulation information during a diagnosis performing process and causing the display screen of at least one of said first and second display devices to be changed to a desired state.

14. An apparatus for operating and monitoring plant according to claim 1, wherein said second display data producing means control said second display device in a manner that, when an occurrence of an abnormality in the plant is determined by said abnormality decision means, said second display device simultaneously displays a detailed analysis diagram of the system in which an abnormality condition has occurred as well as said alarm for each of said systems, said general configuration diagram of the plant and said process variables.

15. An apparatus for operating and monitoring plant according to claim 1, wherein said first display data producing means displays, on said first display device, detailed alarm information of an alarm which occurred in said system in which the abnormality condition has occurred as said plant information in a manner that said alarm for each of said systems displayed on said second display device and said detailed alarm information displayed on said first display device are displayed in a hierarchical expression manner.

* * * * *